US008692780B2

(12) United States Patent
Lemay

(10) Patent No.: US 8,692,780 B2
(45) Date of Patent: Apr. 8, 2014

(54) DEVICE, METHOD, AND GRAPHICAL USER INTERFACE FOR MANIPULATING INFORMATION ITEMS IN FOLDERS

(75) Inventor: Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 732 days.

(21) Appl. No.: 12/789,430

(22) Filed: May 27, 2010

(65) Prior Publication Data

US 2011/0163970 A1 Jul. 7, 2011

Related U.S. Application Data

(60) Provisional application No. 61/335,517, filed on Jan. 6, 2010.

(51) Int. Cl.
*G06F 3/041* (2006.01)

(52) U.S. Cl.
USPC .......................................... 345/173; 715/790

(58) Field of Classification Search
USPC ................................................. 345/173–181
See application file for complete search history.

(56) References Cited

U.S. PATENT DOCUMENTS

| 5,757,368 | A * | 5/1998 | Gerpheide et al. ............ 715/769 |
| 7,015,910 | B2 * | 3/2006 | Card et al. .................... 345/427 |
| 2002/0080180 | A1 | 6/2002 | Mander et al. |
| 2004/0143590 | A1 * | 7/2004 | Wong et al. .................... 707/102 |
| 2004/0150671 | A1 | 8/2004 | Kamiwada et al. |
| 2004/0212617 | A1 * | 10/2004 | Fitzmaurice et al. ......... 345/440 |
| 2005/0052427 | A1 * | 3/2005 | Wu et al. ....................... 345/173 |
| 2005/0275636 | A1 * | 12/2005 | Dehlin et al. ................. 345/173 |
| 2008/0201382 | A1 | 8/2008 | Zagorski |
| 2008/0282202 | A1 * | 11/2008 | Sunday .......................... 715/863 |
| 2009/0282063 | A1 | 11/2009 | Shockro et al. |
| 2009/0307623 | A1 * | 12/2009 | Agarawala et al. ........... 715/765 |
| 2010/0088641 | A1 * | 4/2010 | Choi .............................. 715/828 |
| 2010/0103321 | A1 * | 4/2010 | Ishikawa et al. .............. 348/659 |
| 2010/0207892 | A1 * | 8/2010 | Lin et al. ........................ 345/173 |
| 2010/0283743 | A1 * | 11/2010 | Coddington .................. 345/173 |
| 2011/0050640 | A1 * | 3/2011 | Lundback et al. ............ 345/175 |

FOREIGN PATENT DOCUMENTS

| WO | WO 96/30809 A1 | 10/1996 |
| WO | WO 2009/143076 A2 | 11/2009 |

OTHER PUBLICATIONS

International Search Report and Written Opinion dated Aug. 2, 2011, received in International Application No. PCT/US2010/062590, which corresponds to U.S. Appl. No. 12/789,430.

* cited by examiner

*Primary Examiner* — Christopher E Leiby
(74) *Attorney, Agent, or Firm* — Morgan, Lewis & Bockius LLP

(57) ABSTRACT

A method includes: displaying a group of selectable objects in a first region of a display, each selectable object corresponding to a respective information item; detecting selection of a plurality of selectable objects in the group of selectable objects; in response to detecting selection of the plurality of selectable objects, displaying a pile of two or more information items corresponding to the plurality of selectable objects at a first location in a second region of the display, each information item having a partially overlapping position with a neighboring information item in the pile; detecting a gesture on the pile on the display; in response to detecting the gesture on the pile, moving the pile away from the first location in the second region; detecting lift-off of the gesture from the pile; and in response to detecting the lift-off, moving the pile back to the first location in the second region.

37 Claims, 28 Drawing Sheets

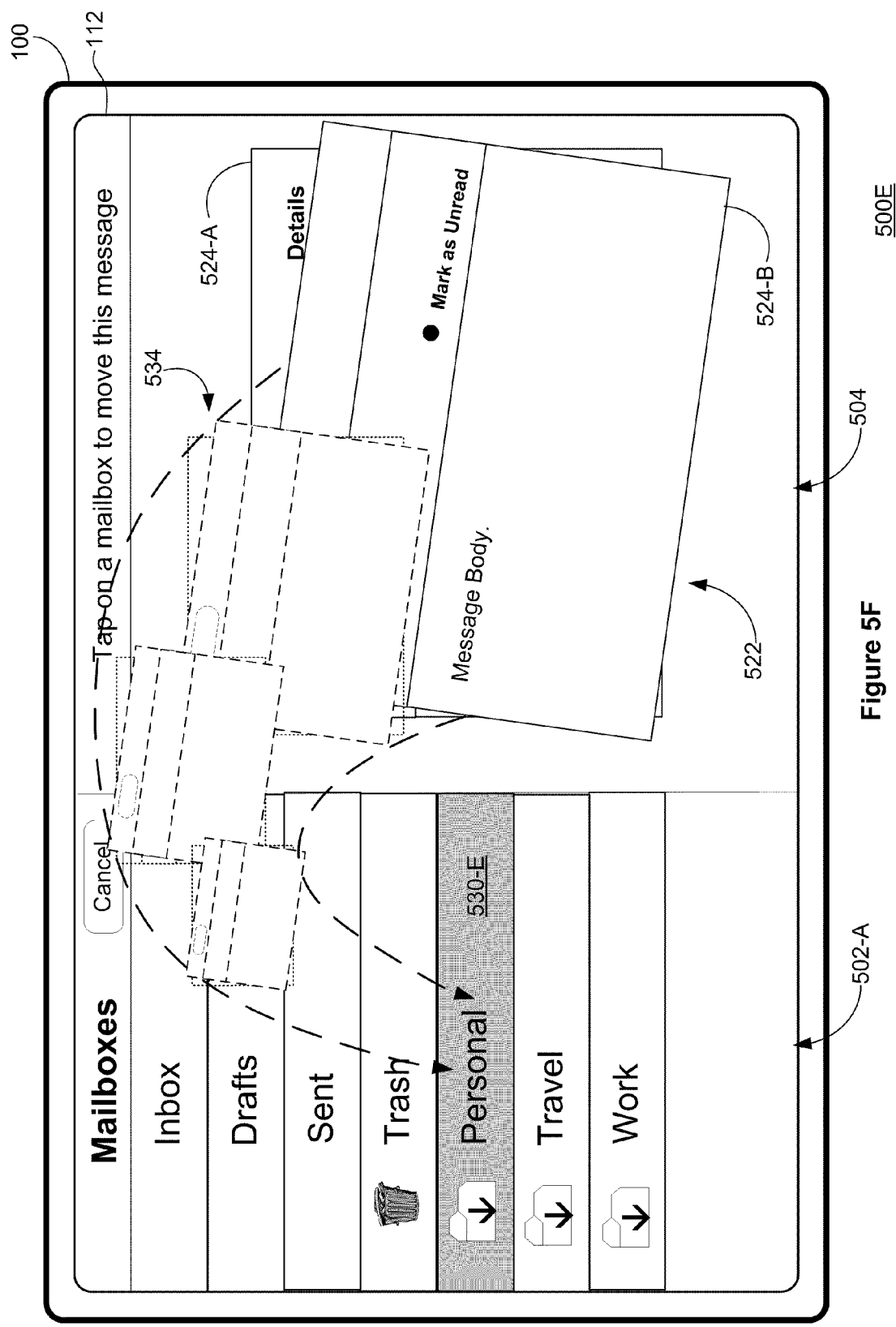

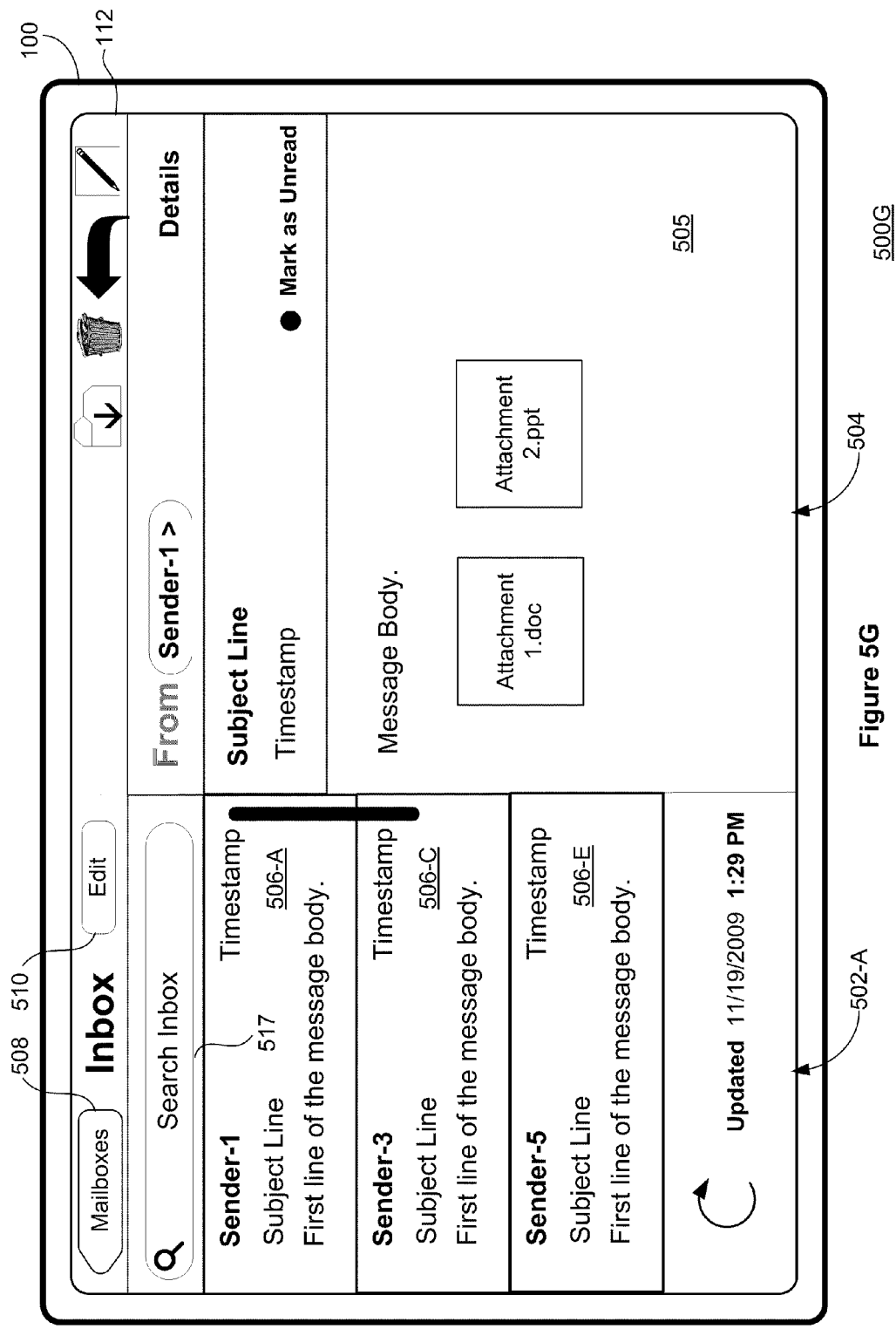

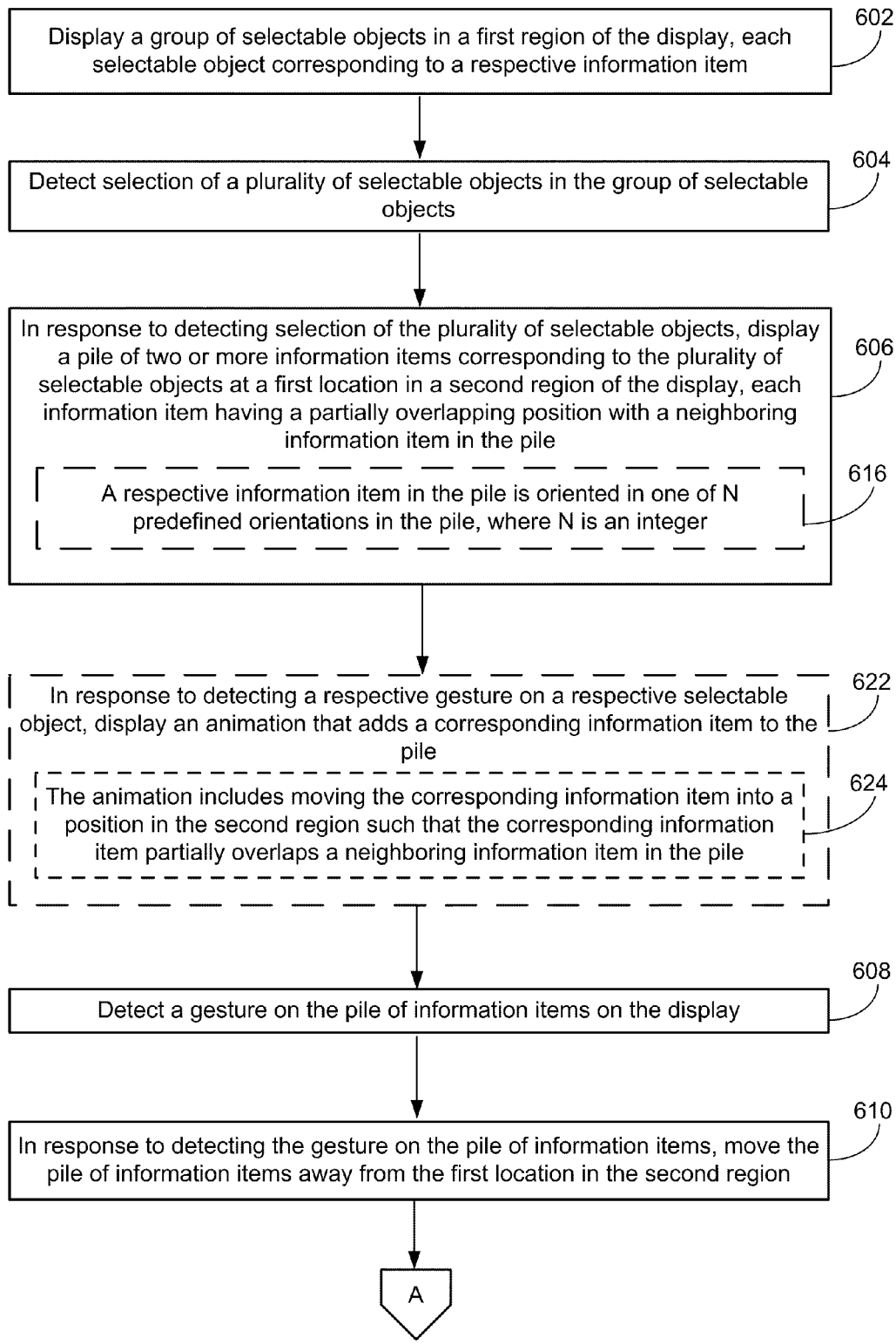
Figure 6A    600

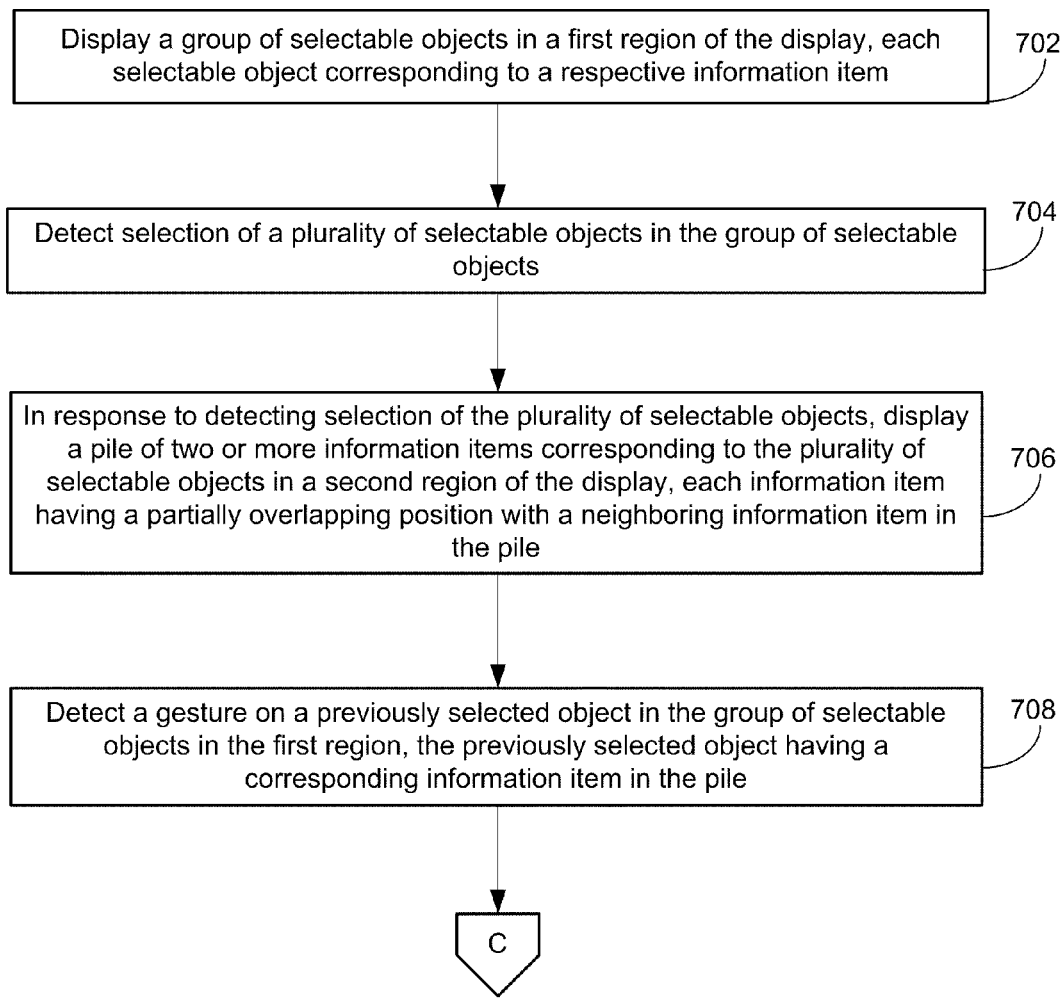
Figure 7A    700

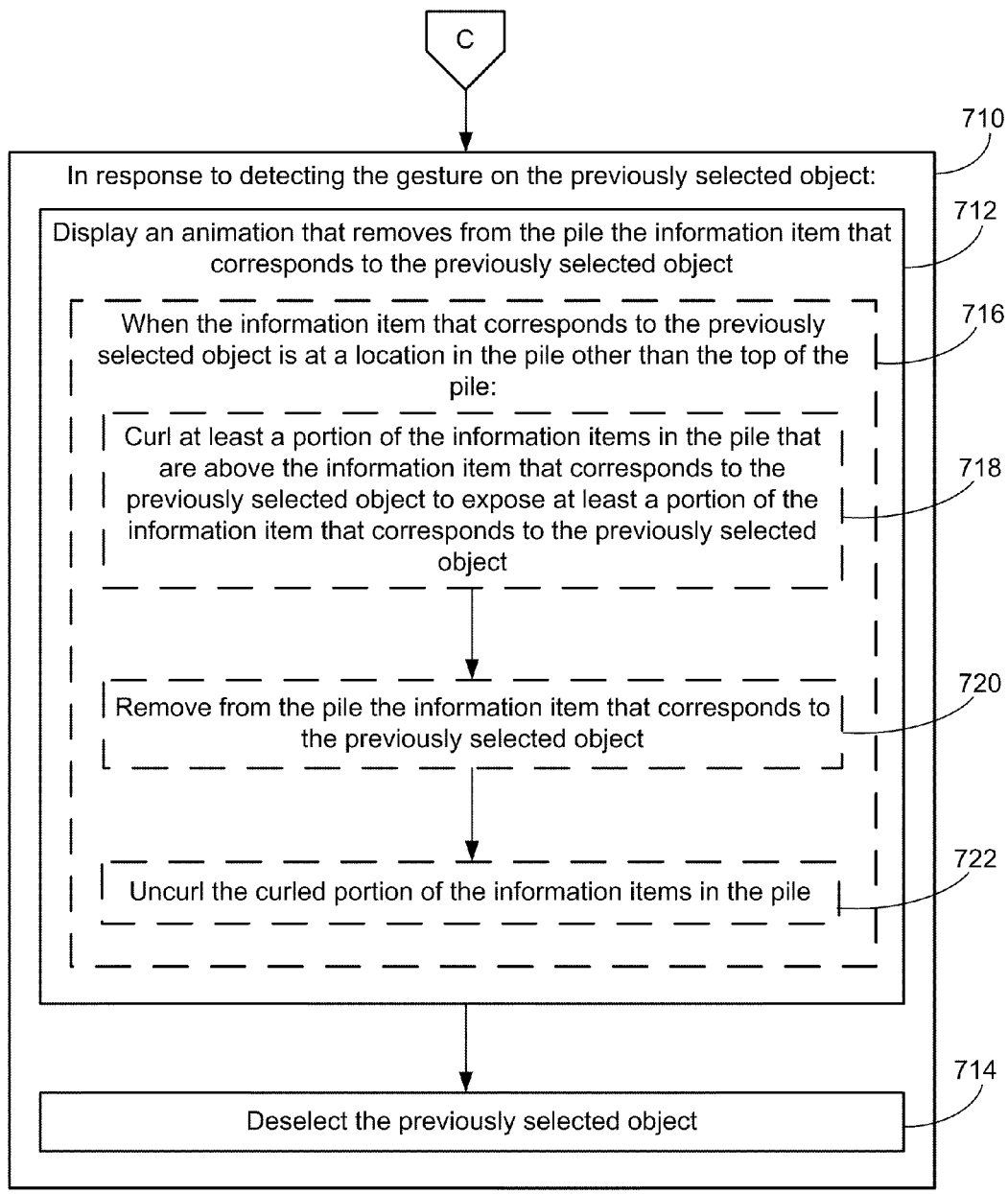
Figure 7B    700

DEVICE, METHOD, AND GRAPHICAL USER INTERFACE FOR MANIPULATING INFORMATION ITEMS IN FOLDERS

RELATED APPLICATIONS

This application claims priority to U.S. Provisional Application Ser. No. 61/335,517, filed Jan. 6, 2010, entitled "Device, Method, and Graphical User Interface for Manipulating Information Items in Folders," which is incorporated herein by reference in its entirety.

TECHNICAL FIELD

This relates generally to electronic devices with touch-sensitive surfaces, including but not limited to electronic devices with touch-sensitive surfaces that manipulate information items in folders.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate information items in folders.

But existing methods for manipulating information items in folders are cumbersome and inefficient. For example, moving multiple email messages to a folder by performing multiple email message selection operations on individual email messages is tedious and creates a significant cognitive burden on a user. In addition, some conventional methods take longer than necessary, thereby wasting a user's time and a device's power reserve, which can be a particularly important consideration for battery-operated devices.

SUMMARY

Accordingly, there is a need for computing devices with faster, more efficient methods and interfaces for manipulating information items in folders. Such methods and interfaces may complement or replace conventional methods for manipulating information items in folders. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a touch-sensitive display. The method includes: displaying a group of selectable objects in a first region of the display, each selectable object corresponding to a respective information item; detecting selection of a plurality of selectable objects in the group of selectable objects; in response to detecting selection of the plurality of selectable objects, displaying a pile of two or more information items corresponding to the plurality of selectable objects at a first location in a second region of the display, each information item having a partially overlapping position with a neighboring information item in the pile; detecting a gesture on the pile of information items on the display; in response to detecting the gesture on the pile of information items, moving the pile of information items away from the first location in the second region; detecting lift-off of the gesture from the pile of information items; and in response to detecting lift-off of the gesture, moving the pile of information items back to the first location in the second region.

In accordance with some embodiments, a method is performed at a multifunction device with a touch-sensitive display. The method includes: displaying a group of selectable objects in a first region of the display, each selectable object corresponding to a respective information item; detecting selection of a plurality of selectable objects in the group of selectable objects; in response to detecting selection of the plurality of selectable objects, displaying a pile of two or more information items corresponding to the plurality of selectable objects in a second region of the display, each information item having a partially overlapping position with a neighboring information item in the pile; detecting a gesture on a previously selected object in the group of selectable objects in the first region, the previously selected object having a corresponding information item in the pile; and in response to detecting the gesture on the previously selected object: displaying an animation that removes from the pile the information item that corresponds to the previously selected object, and deselecting the previously selected object.

In accordance with some embodiments, a multifunction device includes a touch-sensitive display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a touch-sensitive display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a touch-sensitive display, cause the device to perform the operations of any of the methods described above. In accordance with some embodiments, a multifunction device includes: a touch-sensitive display; and means for performing the operations of any of the methods described above. In accordance with some embodiments, an information processing apparatus, for use in a multifunction device with a touch-sensitive display, includes means for performing the operations of any of the methods described above.

Thus, multifunction devices with touch screen displays are provided with faster, more efficient methods and interfaces for manipulating information items in folders, thereby increasing the effectiveness, efficiency, and user satisfaction with such devices. Such methods and interfaces may complement or replace conventional methods for manipulating information items in folders.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of manipulating information items in folders in accordance with some embodiments.

FIGS. 7A-7B are flow diagrams illustrating a method of manipulating information items in folders in accordance with some embodiments.

DESCRIPTION OF EMBODIMENTS

Figure 1A:
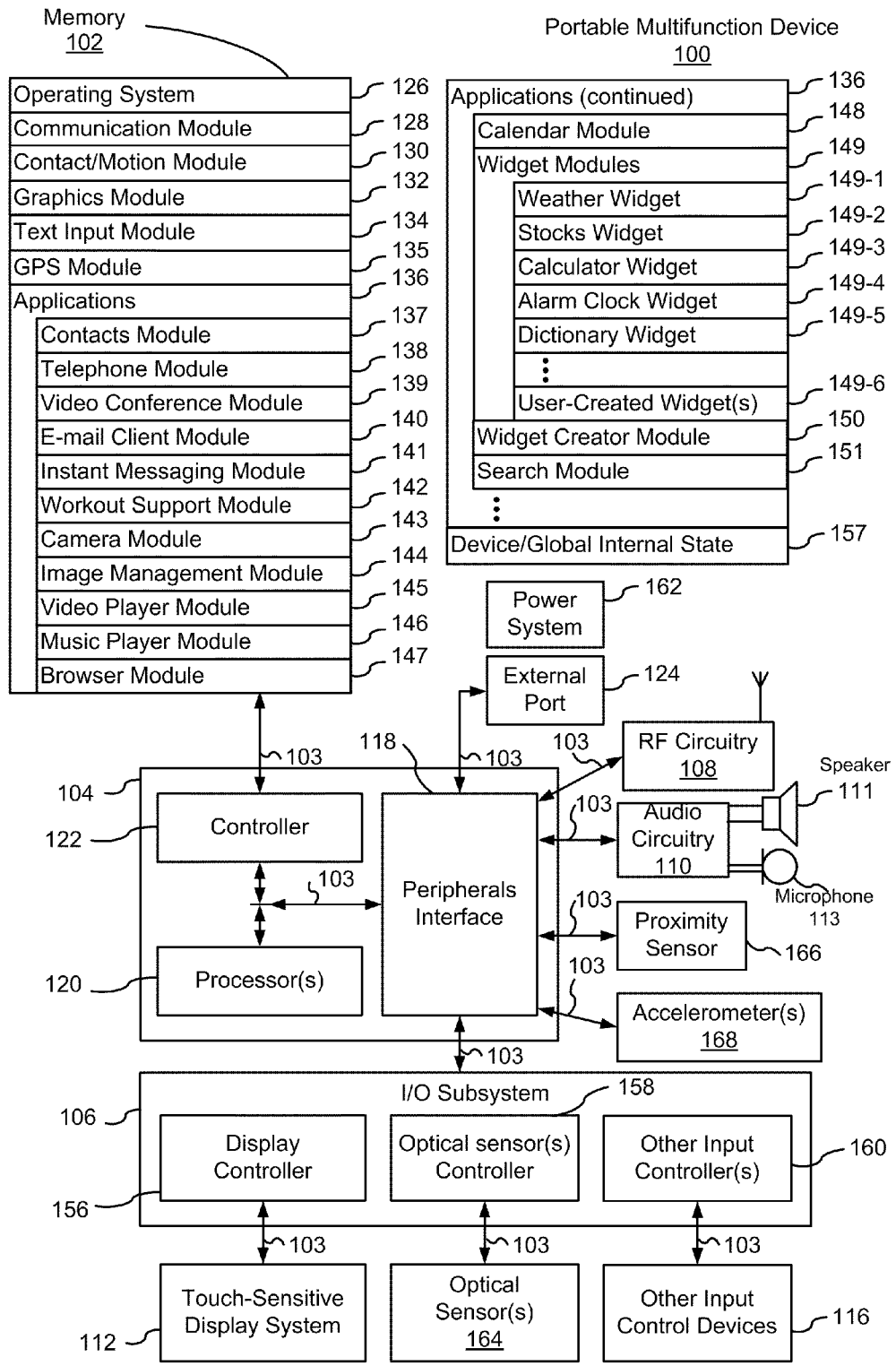
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
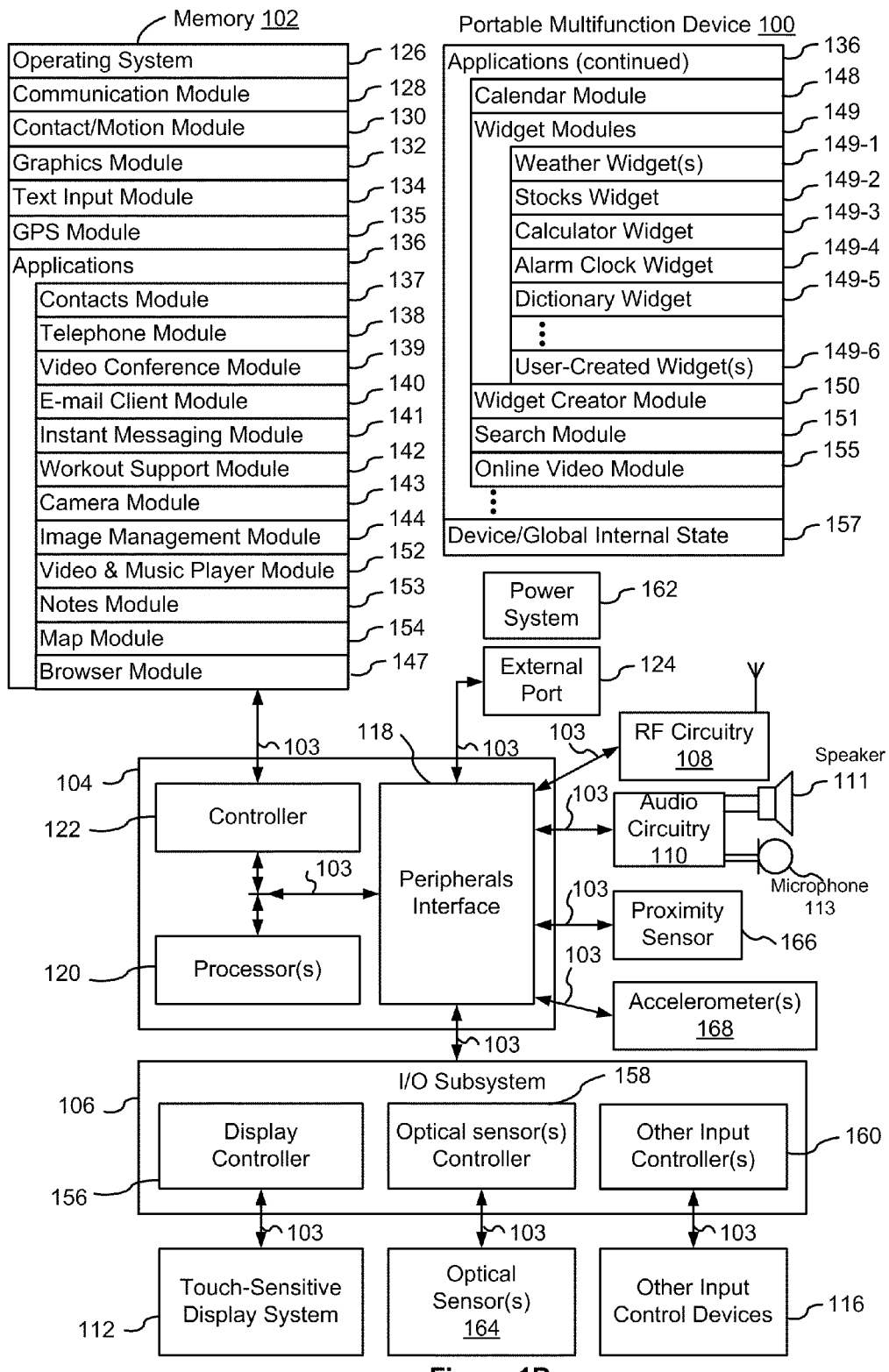

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
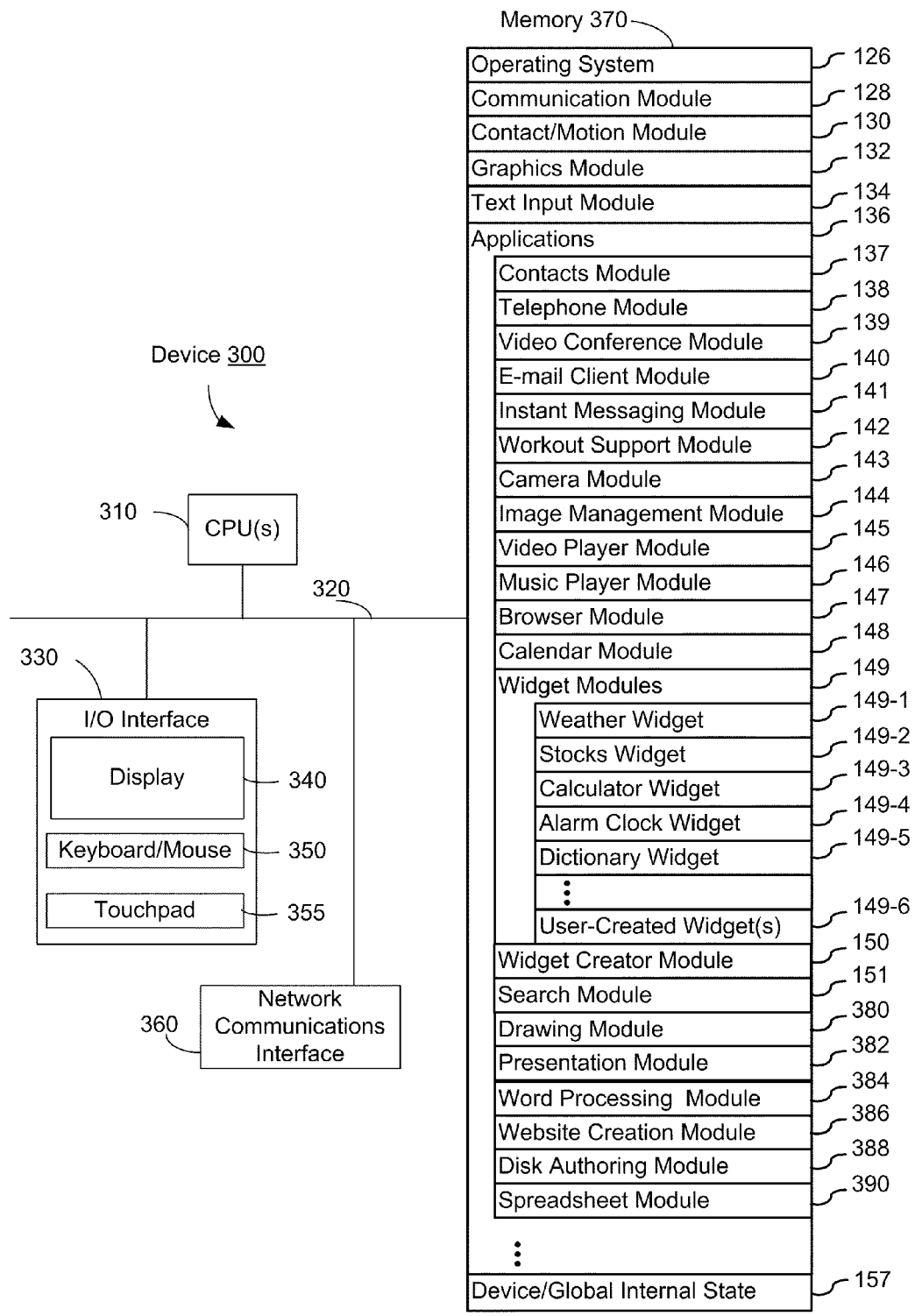
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
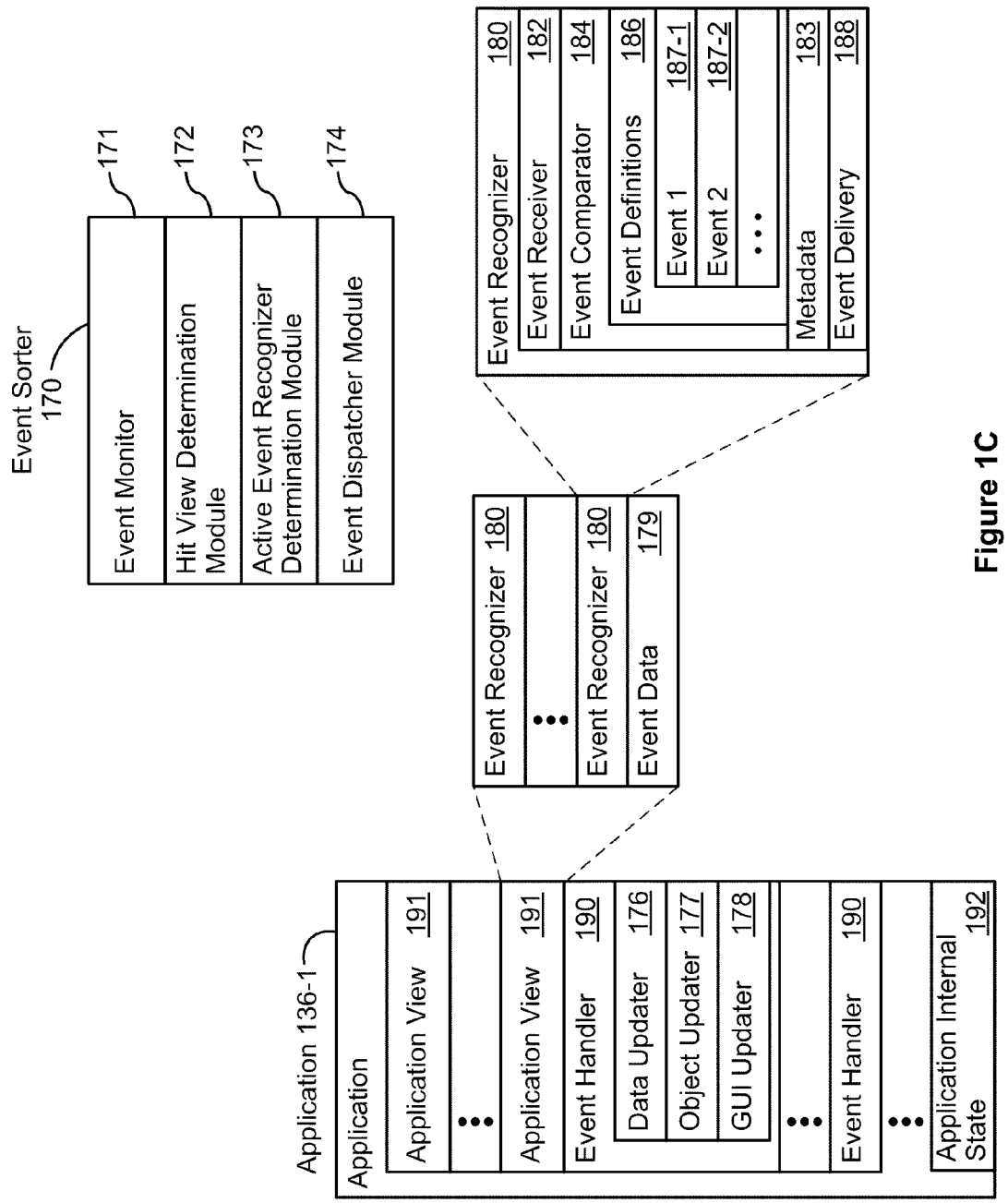
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
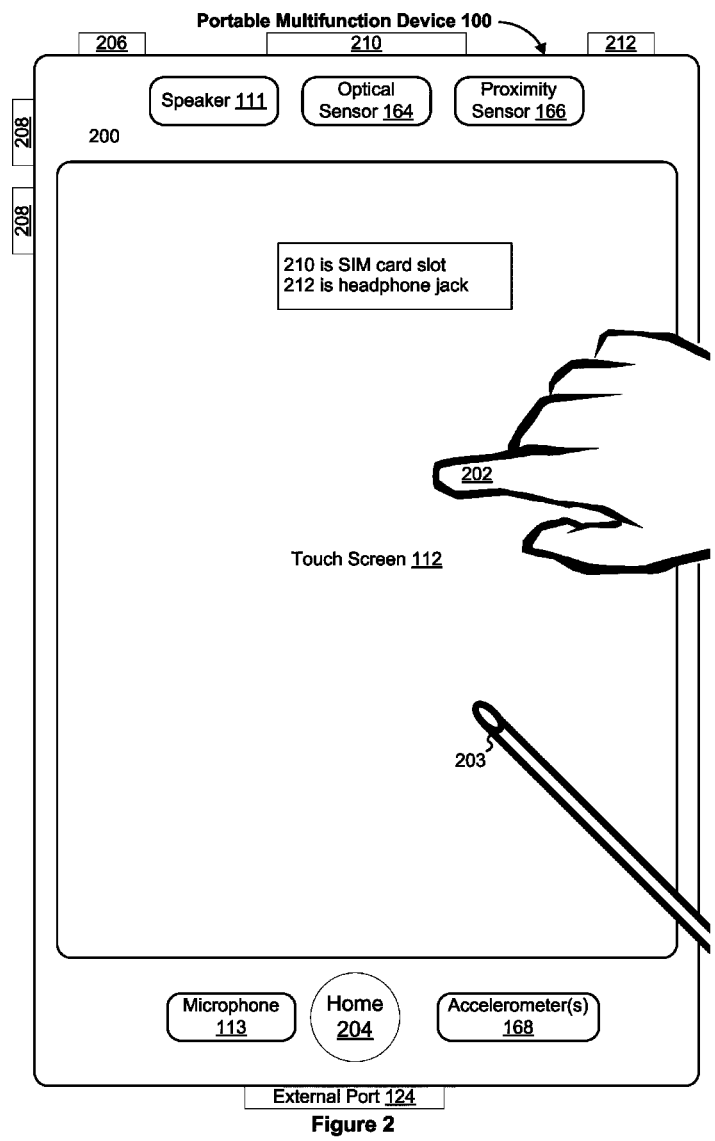
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
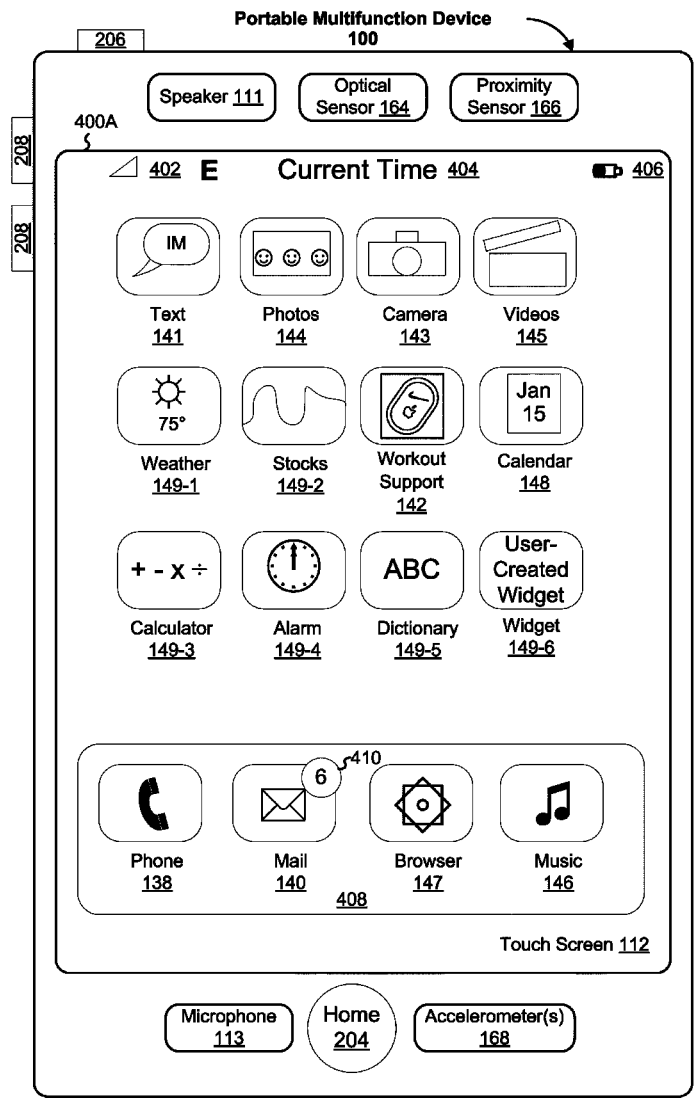
FIGS. 4A and 4B illustrate exemplary user interfaces for a menu of applications on a portable multifunction device in accordance with some embodiments.
Figure 4B:
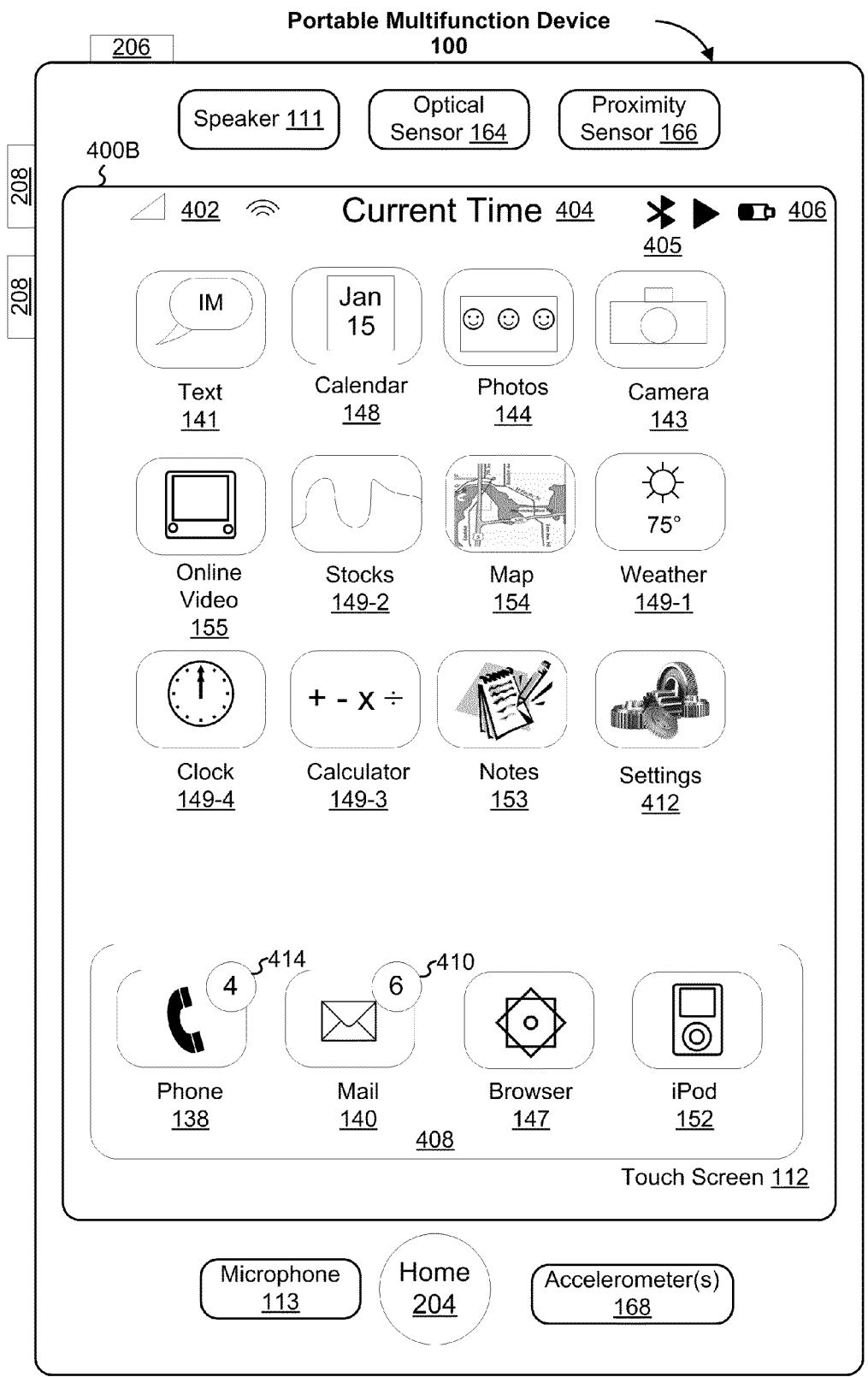

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;

Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;

Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
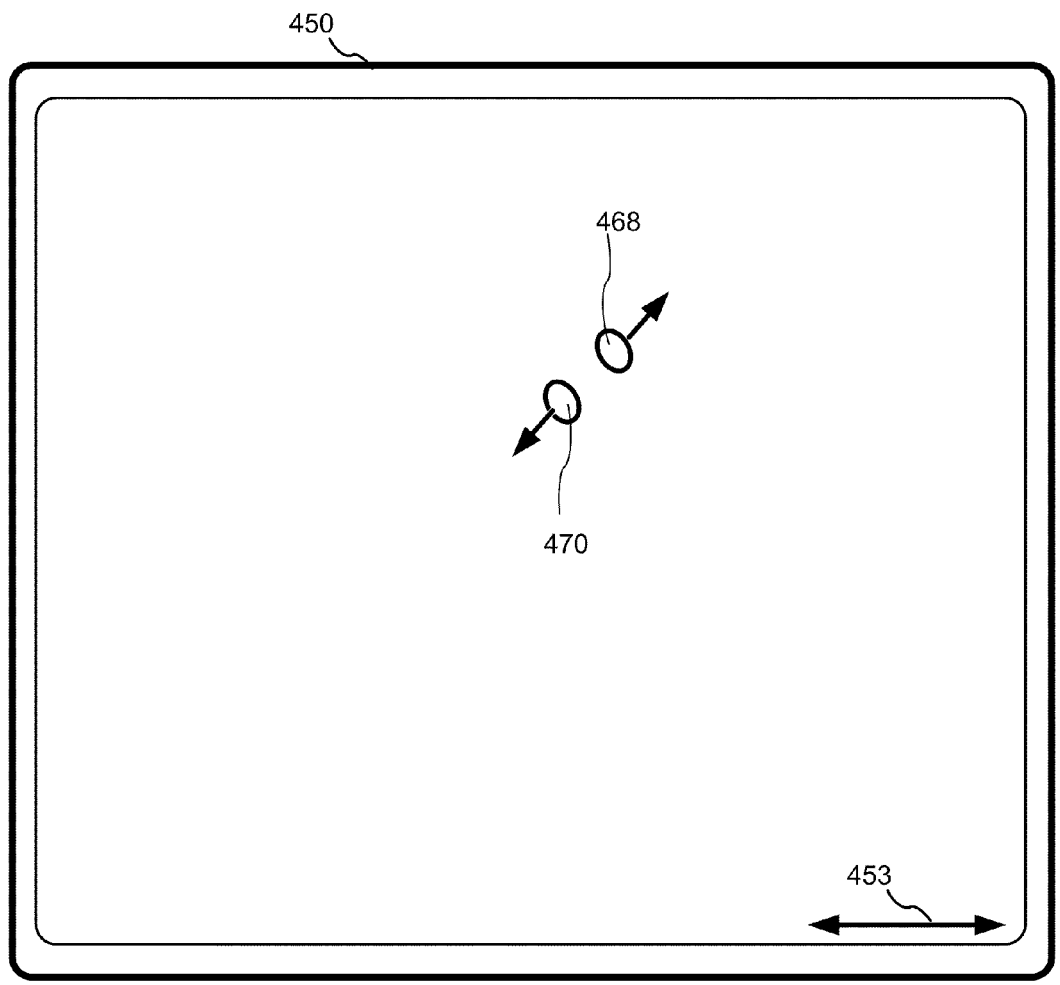
FIG. 4C illustrates an exemplary user interface for a multifunction device with a touch-sensitive surface that is separate from the display in accordance with some embodiments.
Figure 4C:
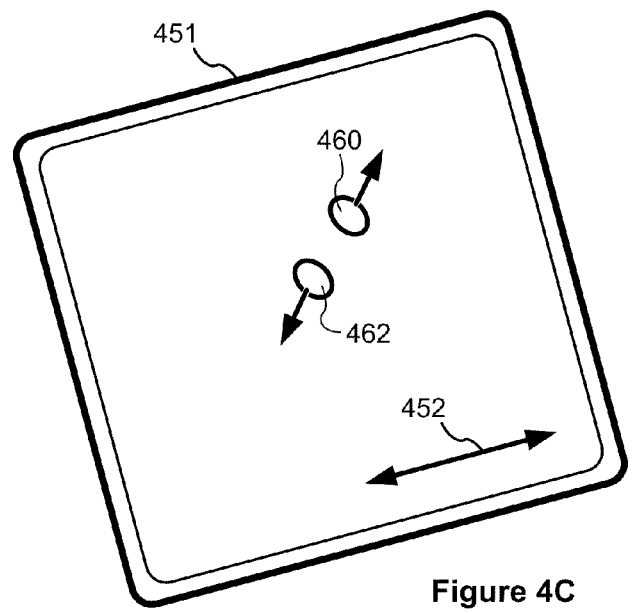

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input).

The following examples include descriptions of user interfaces with reference to user interfaces in landscape orientation and in portrait orientation. It should be appreciated that details of the user interfaces described with reference to landscape orientation are also applicable to the user interfaces in portrait orientation, and vice versa. Examples of user interfaces in landscape orientation and portrait orientation, and transformations and transitions that occur when changing orientation from landscape to portrait, or vice versa, are disclosed in U.S. patent application Ser. No. 12/473,846, titled "Rotation Smoothing of a User Interface," filed May 28, 2009, which is incorporated by reference herein in its entirety.

The following examples include descriptions with reference to an email application or client and user interfaces of an email application or client. Examples of email applications or clients and their user interfaces are disclosed in the following U.S. patent applications, which are incorporated by reference herein in their entirety: U.S. patent application Ser. No. 11/850,630, titled "Email Client for a Portable Multifunction Device," filed Sep. 5, 2007; U.S. patent application Ser. No. 12/242,860, "Portable Multifunction Device, Method, and Graphical User Interface for an Email Client," filed Sep. 30, 2008.

The following examples include descriptions with reference manipulations of user interface objects and other user interface components. Examples of manipulations of user interface objects are disclosed in International Patent Application No. PCT/US09/57899, titled "Device, Method, and Graphical User Interface for Manipulating User Interface Objects," filed Sep. 22, 2009, which is incorporated by reference herein in its entirety.

Attention is now directed towards embodiments of user interfaces ("UI") and associated processes that may be implemented on a multifunction device with a display and a touch-sensitive surface, such as device 300 or portable multifunction device 100.

Figure 5A:
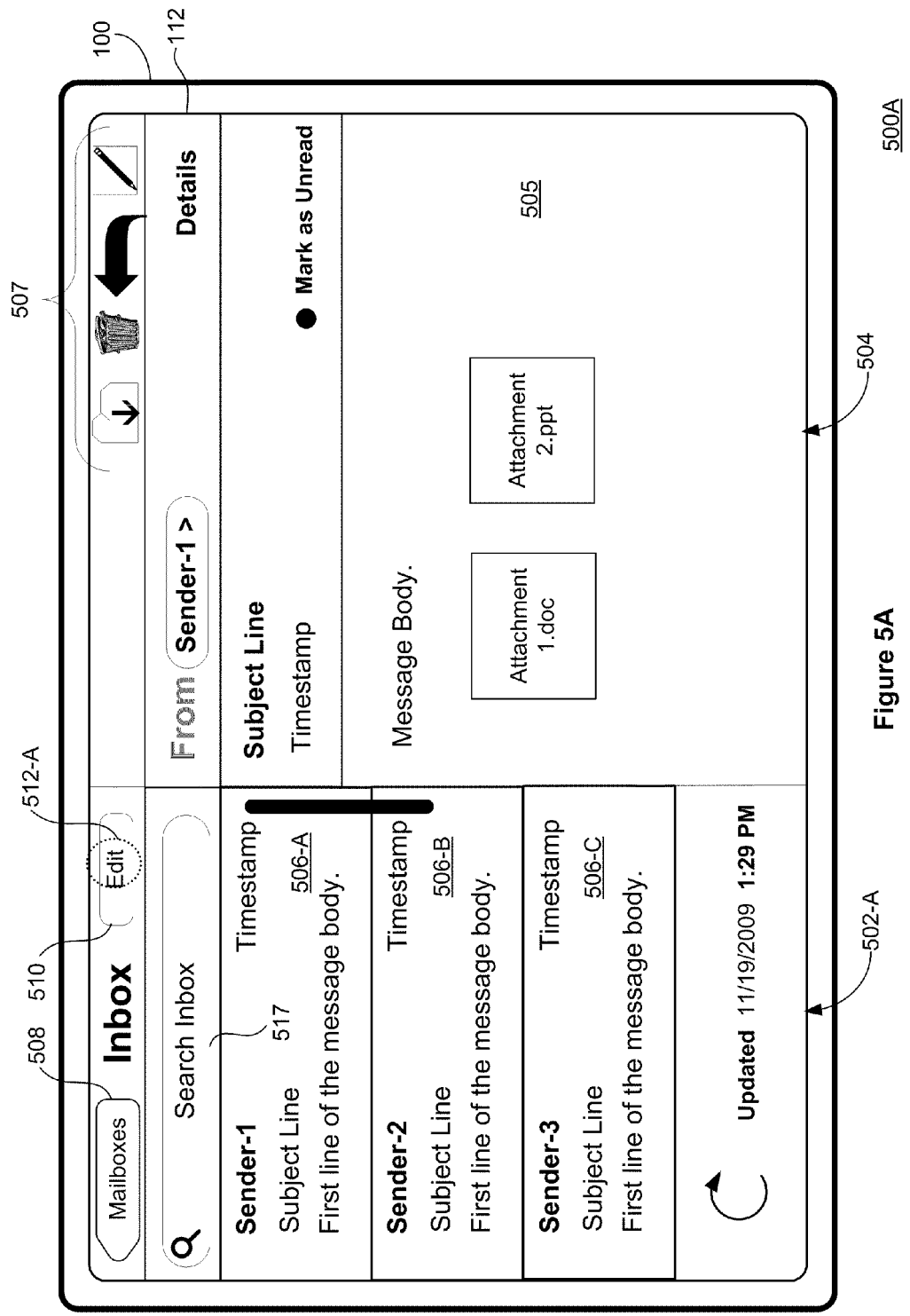
FIGS. 5A-5O illustrate exemplary user interfaces for manipulating information items in folders in accordance with some embodiments.
Figure 5B:
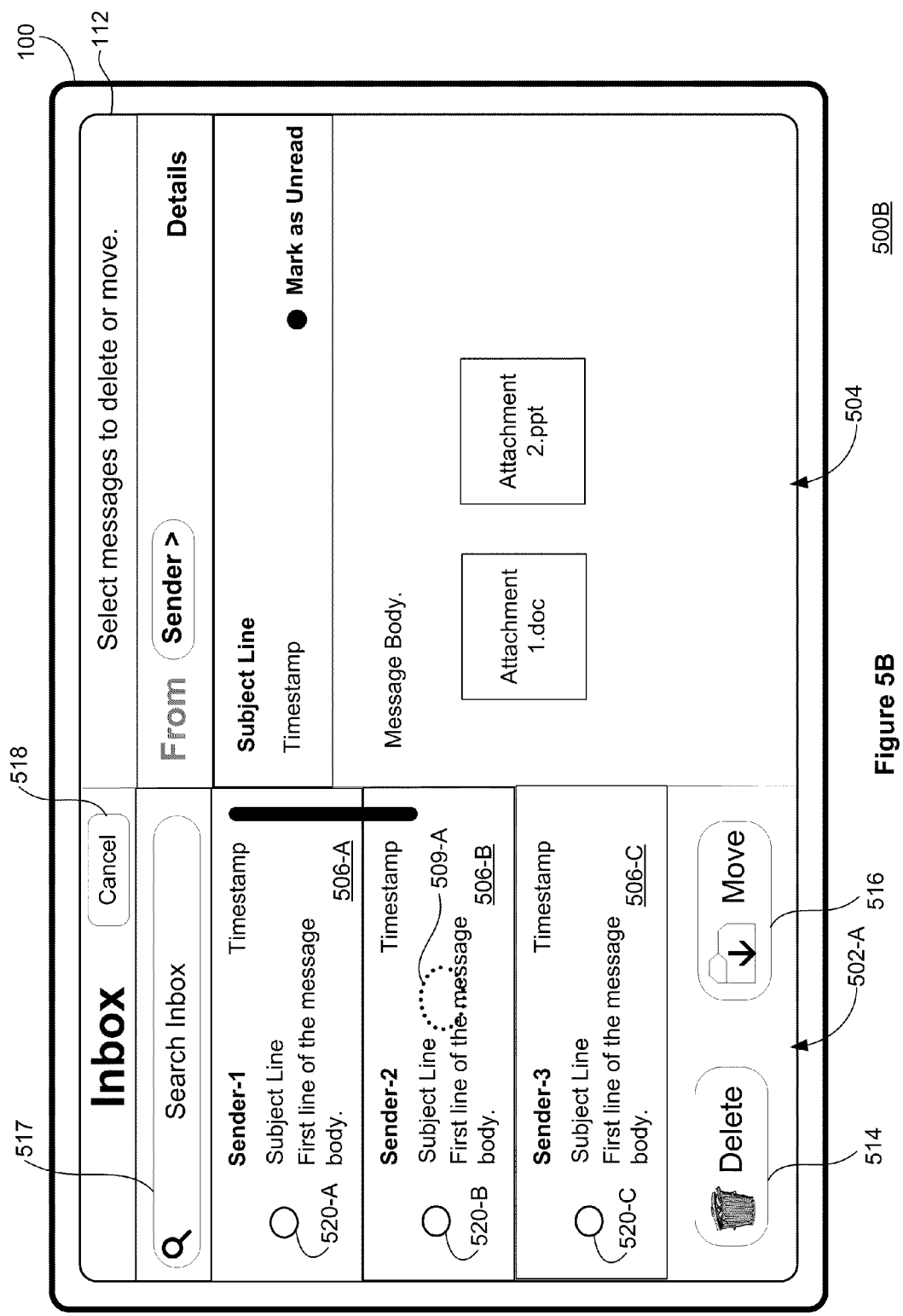
Figure 5C:
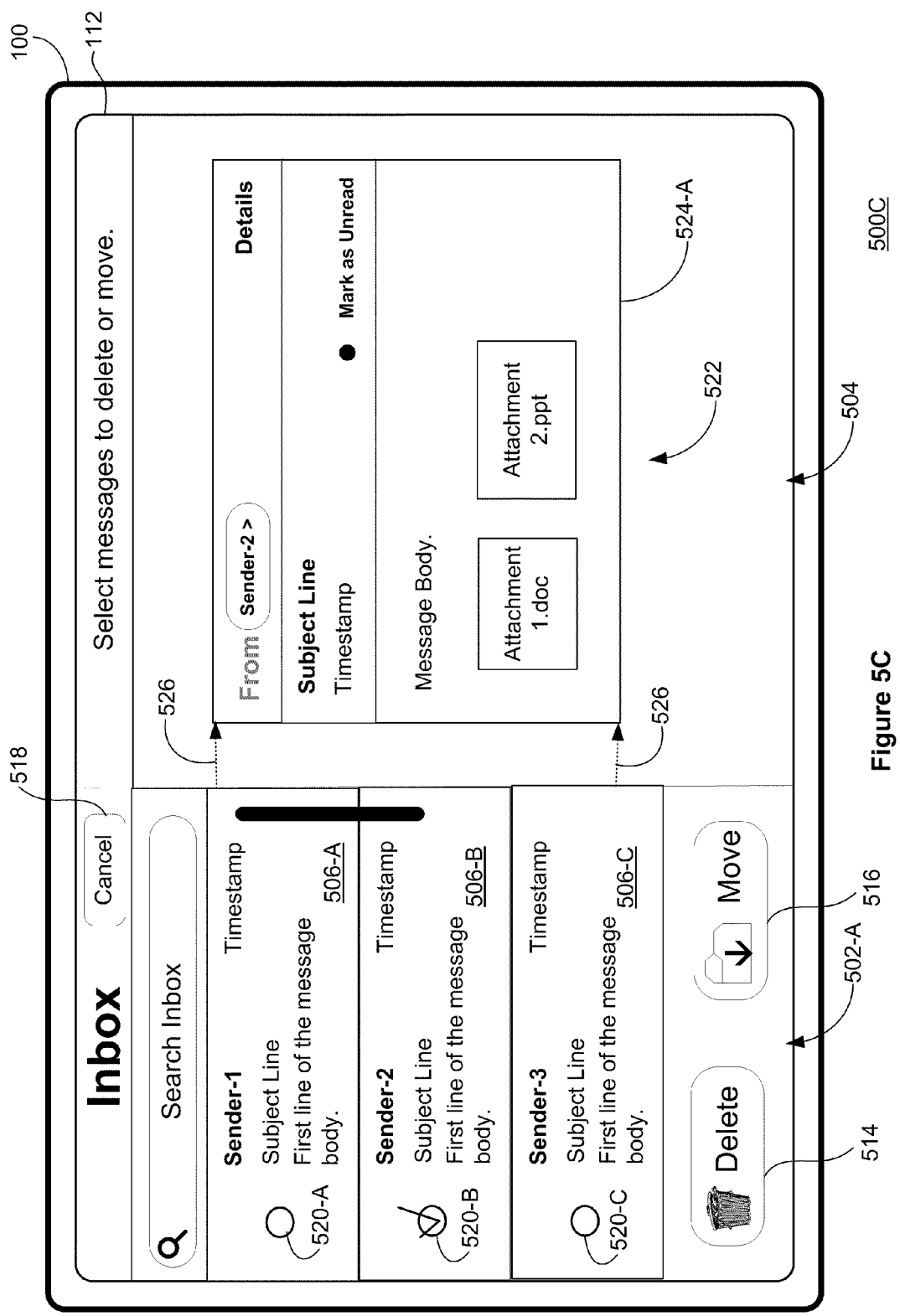
Figure 5D:
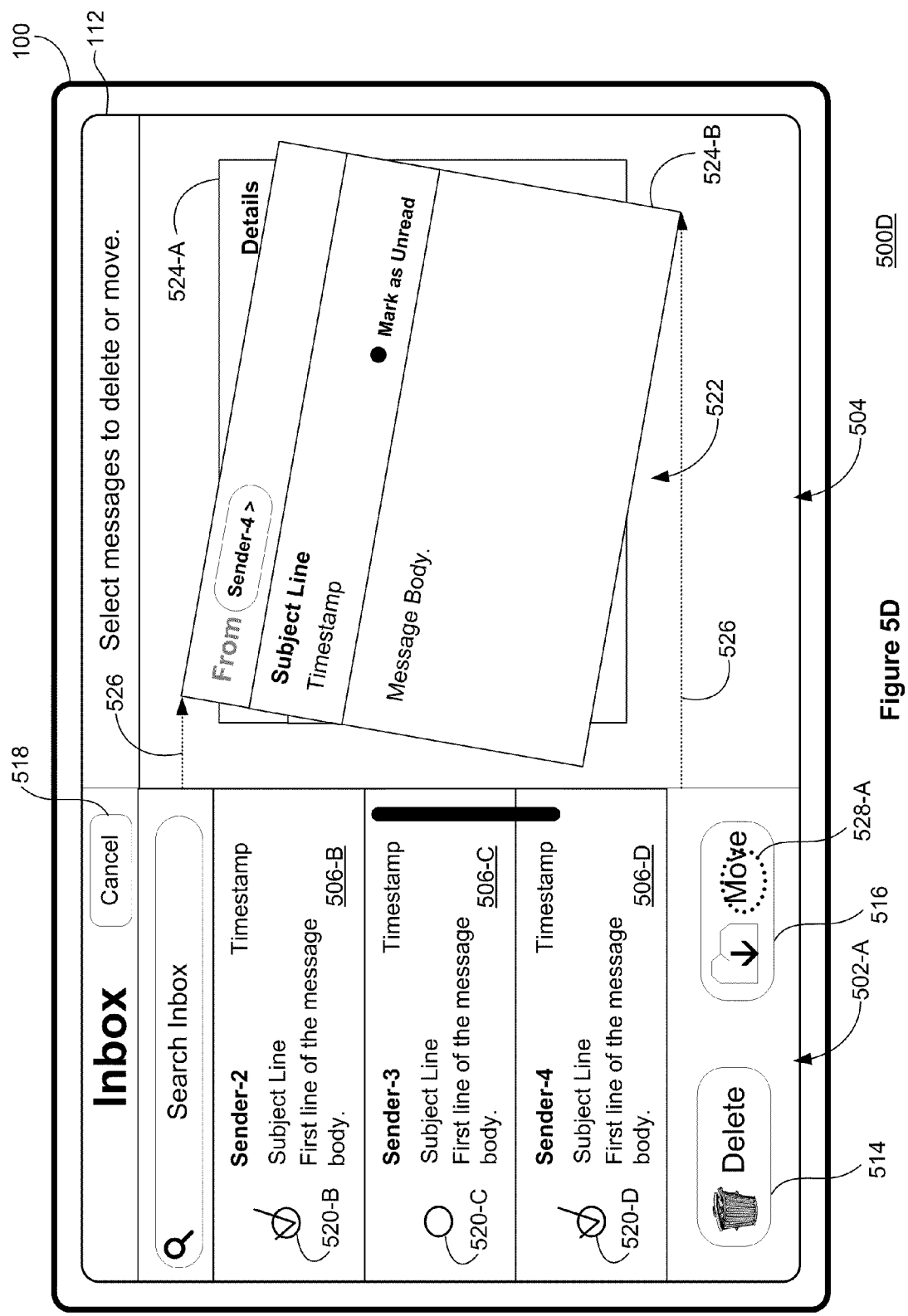
Figure 5E:
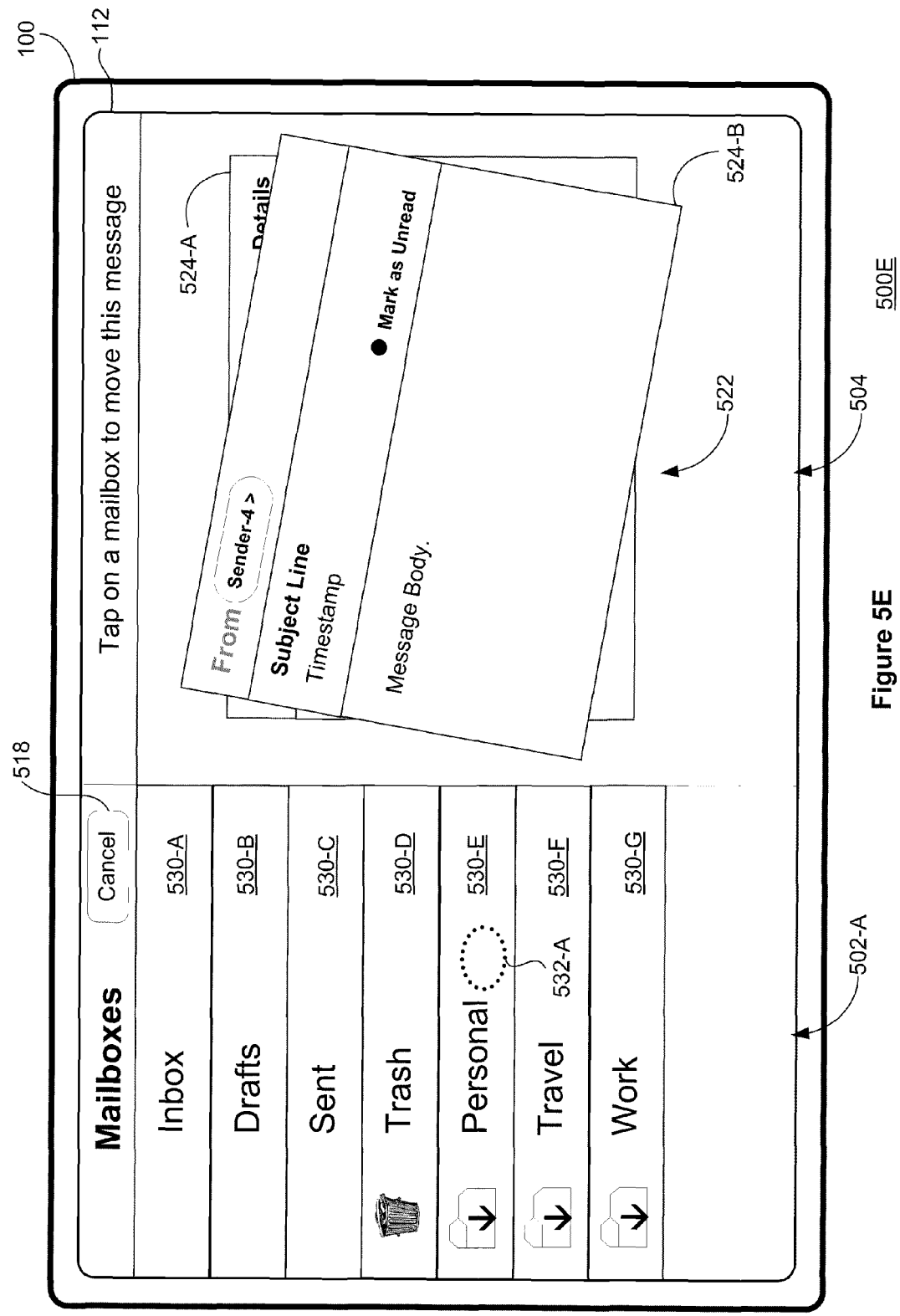
Figure 5H:
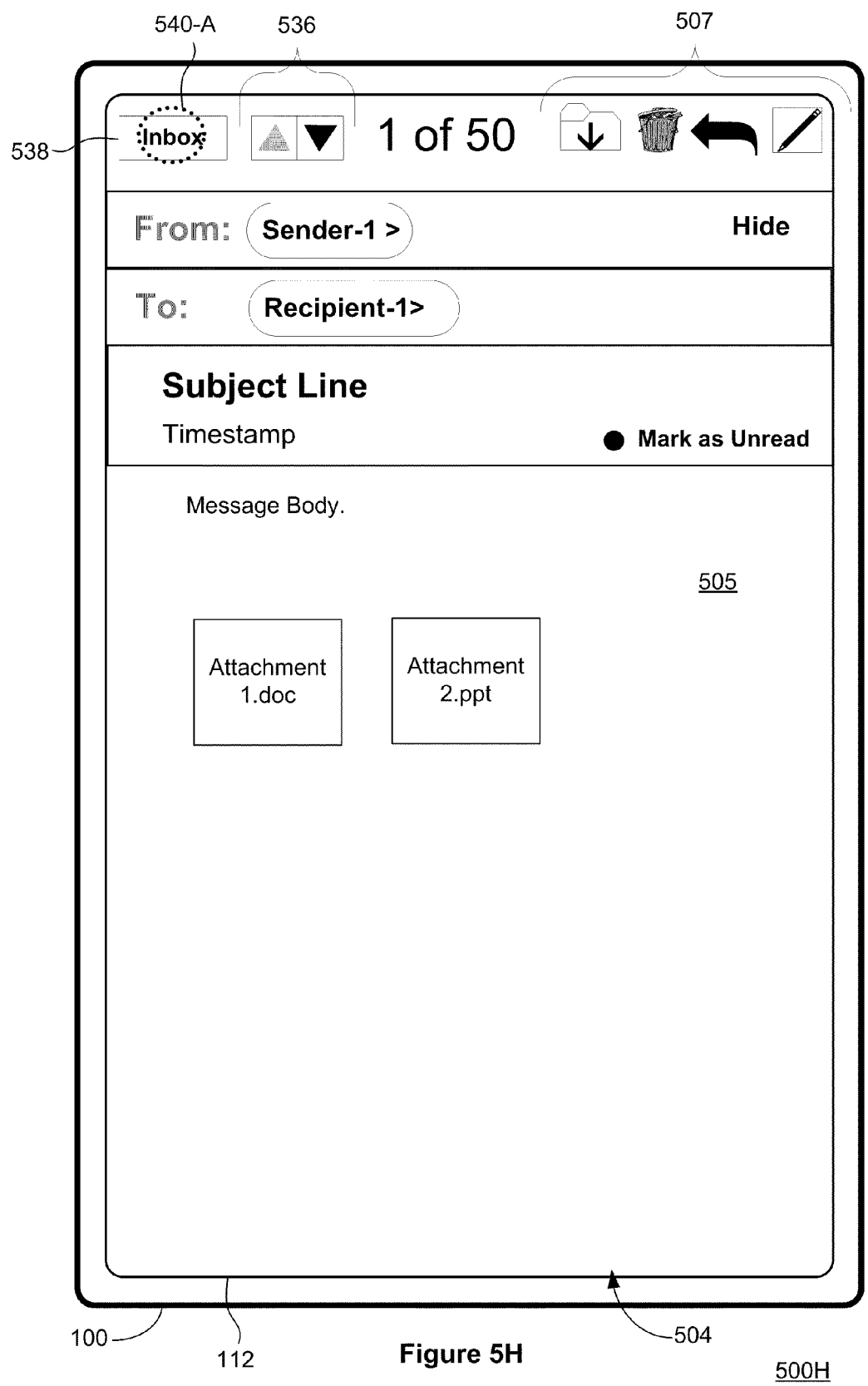
Figure 5I:
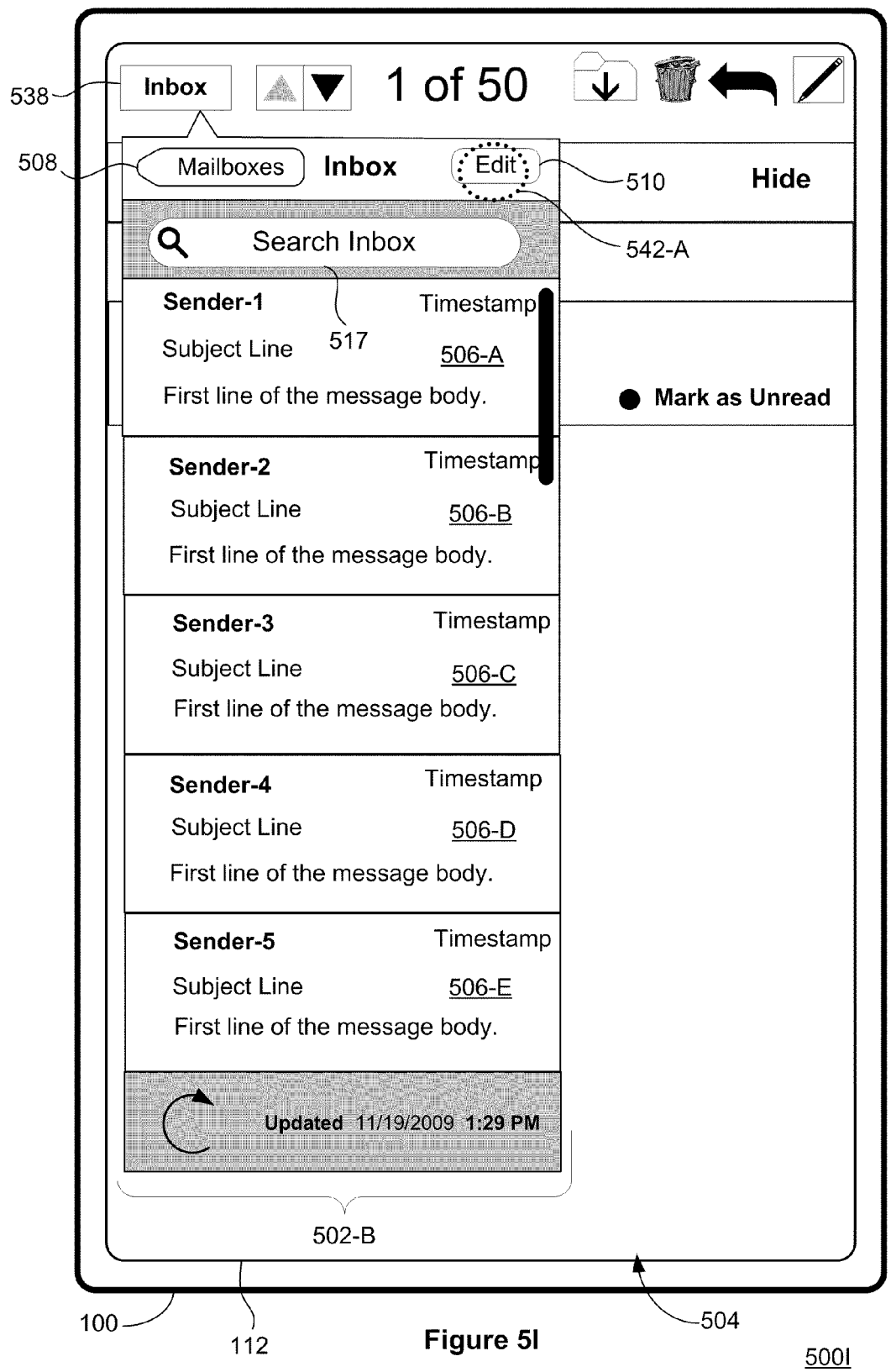
Figure 5J:
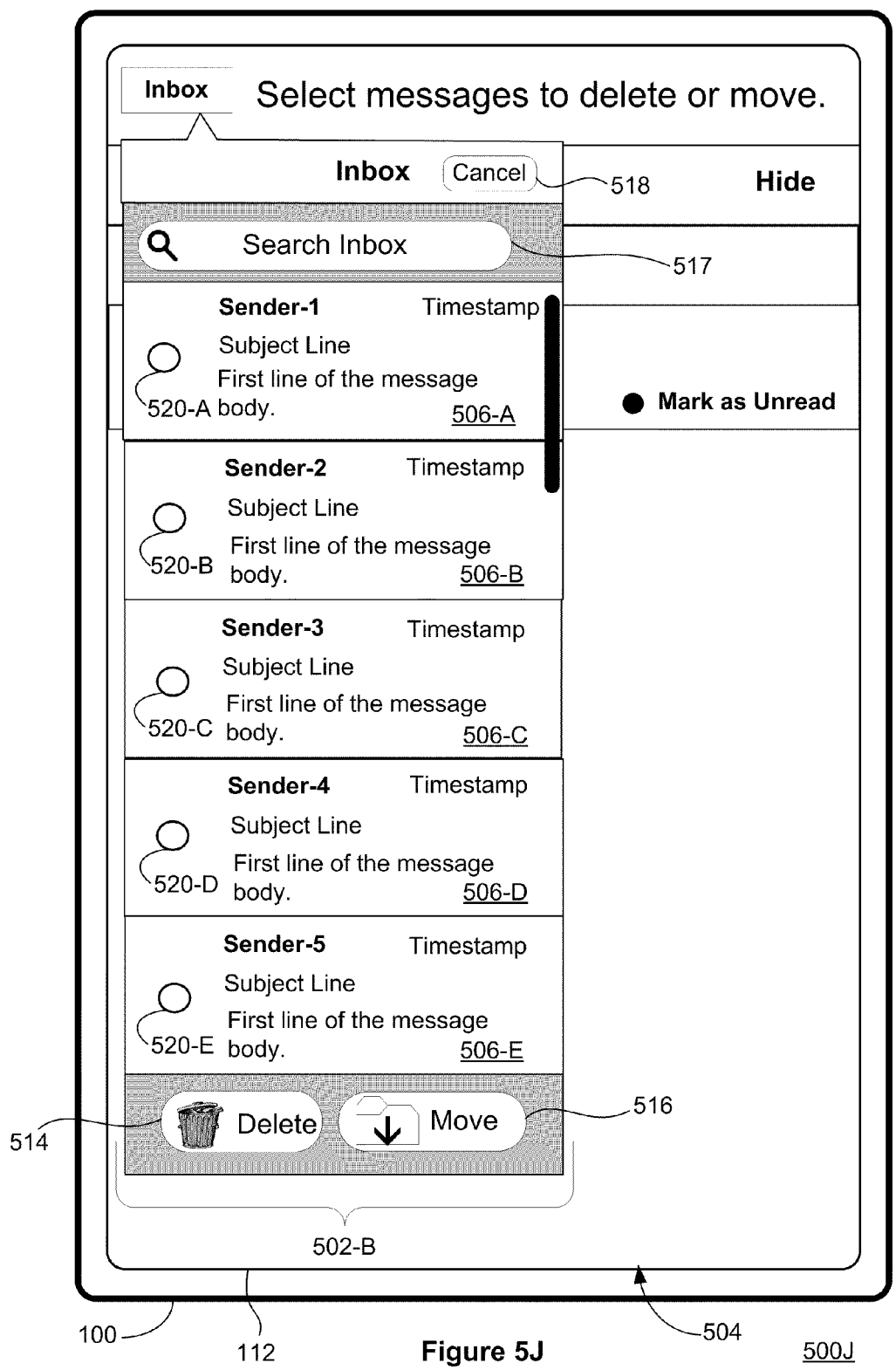
Figure 5K:
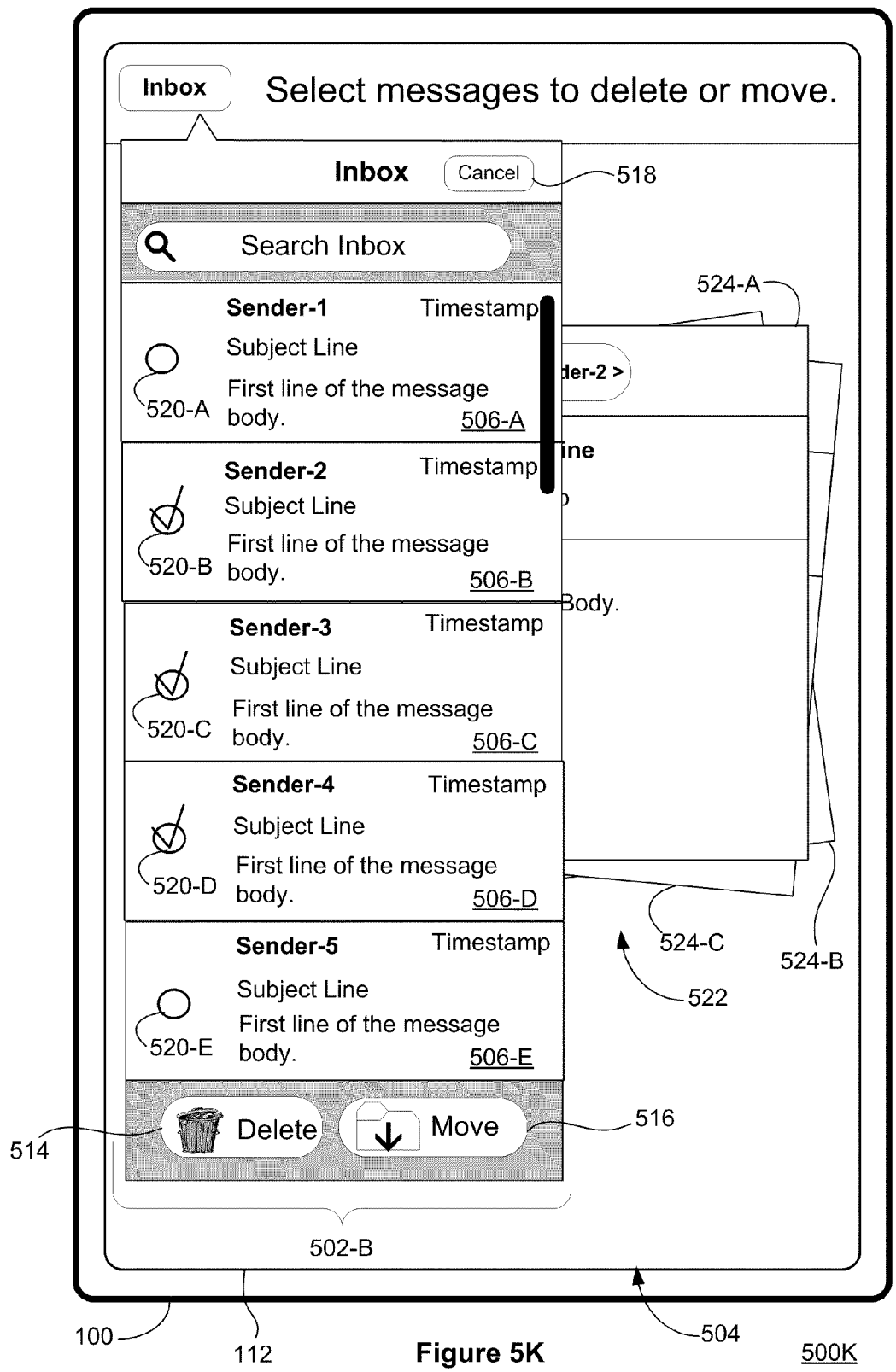
Figure 5L:
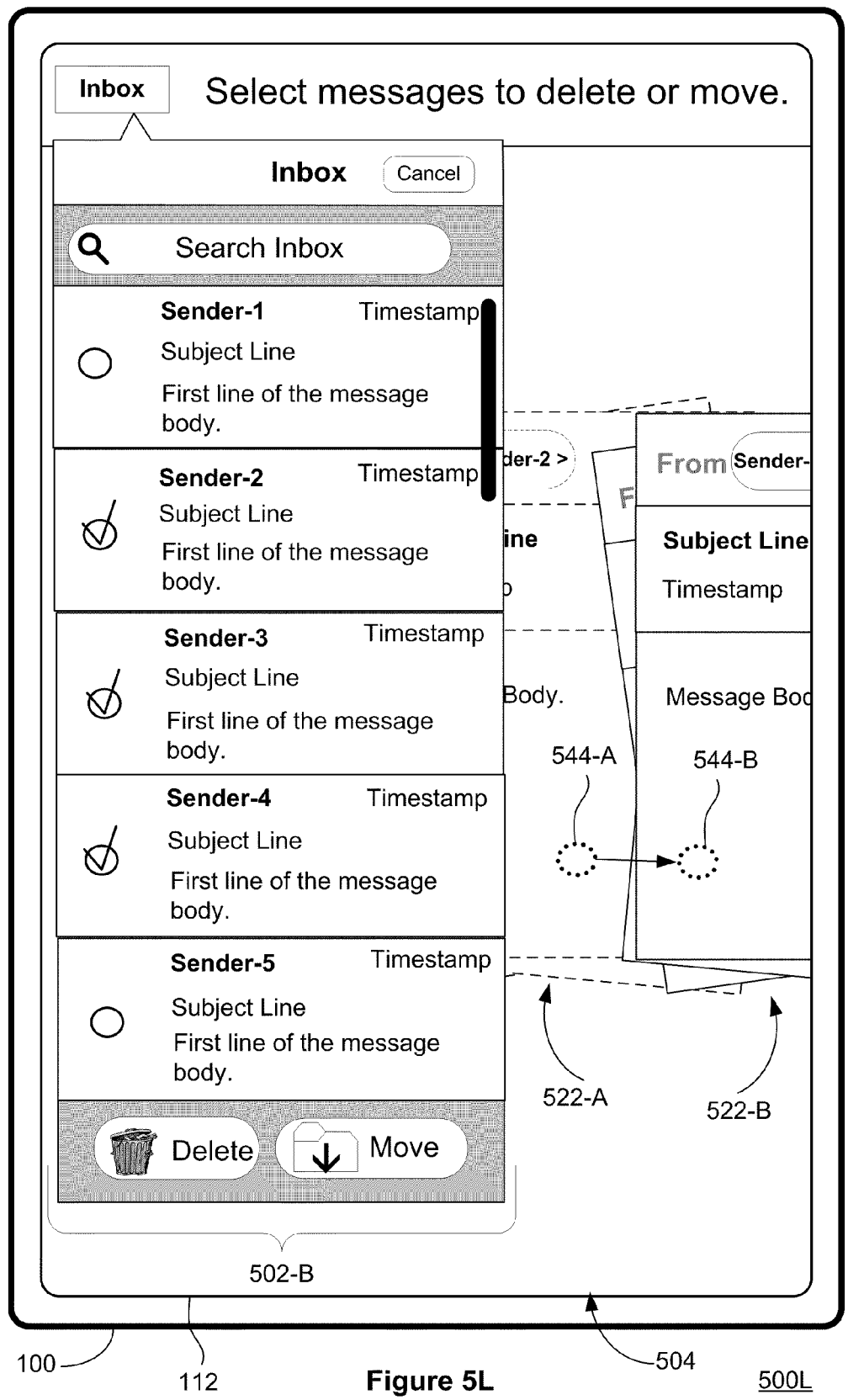
Figure 5M:
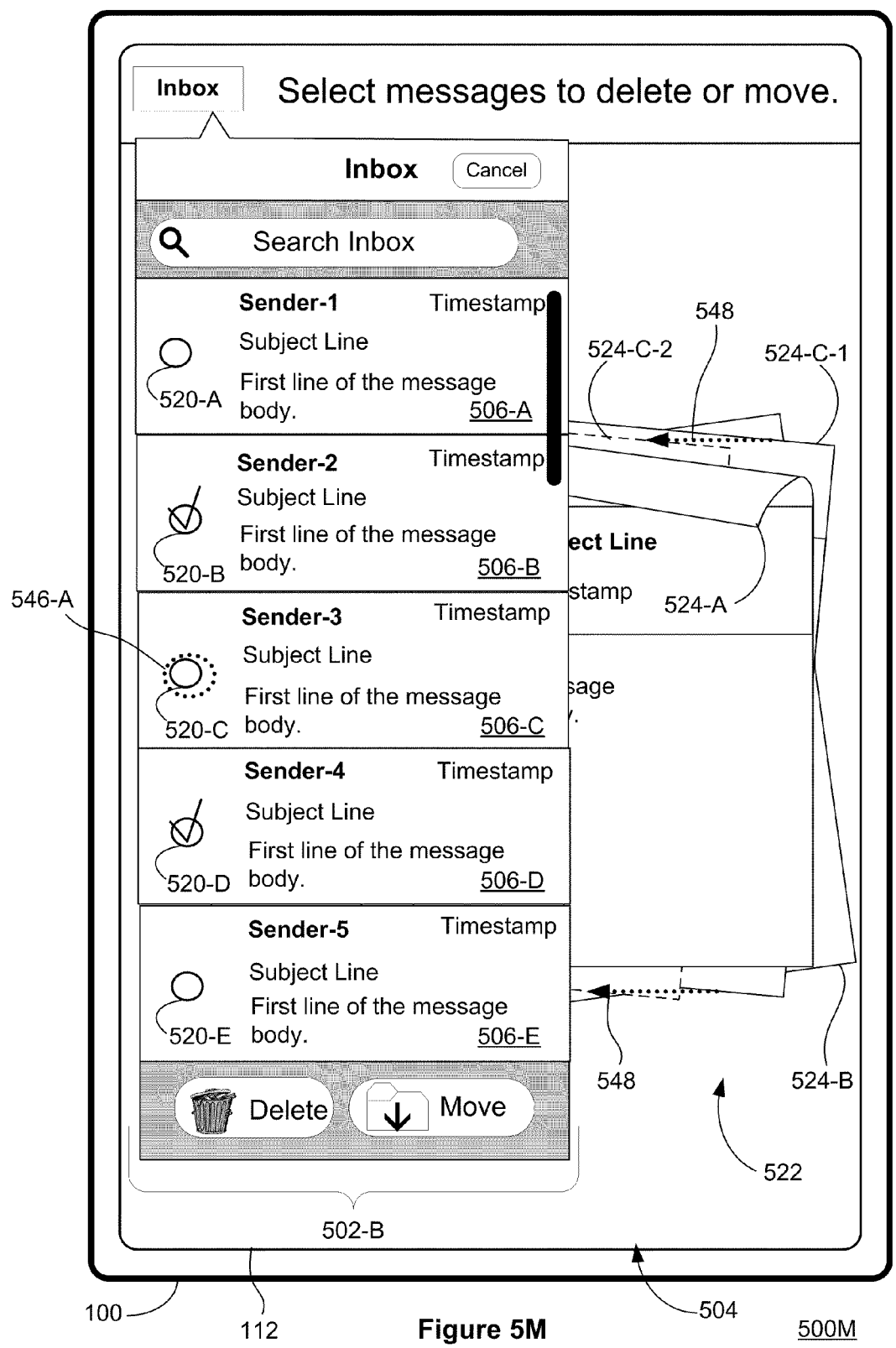
Figure 5N:
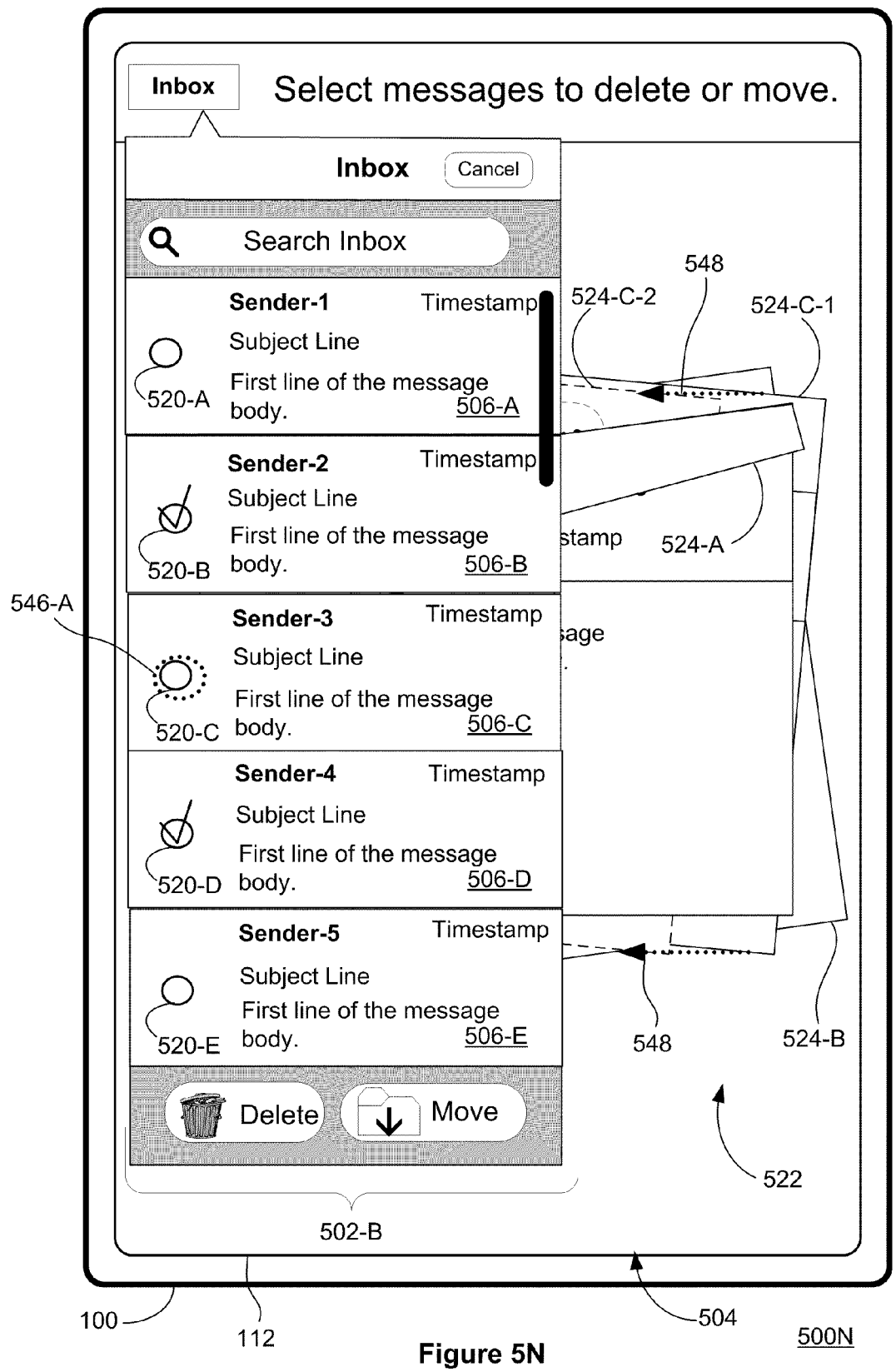
Figure 5O:
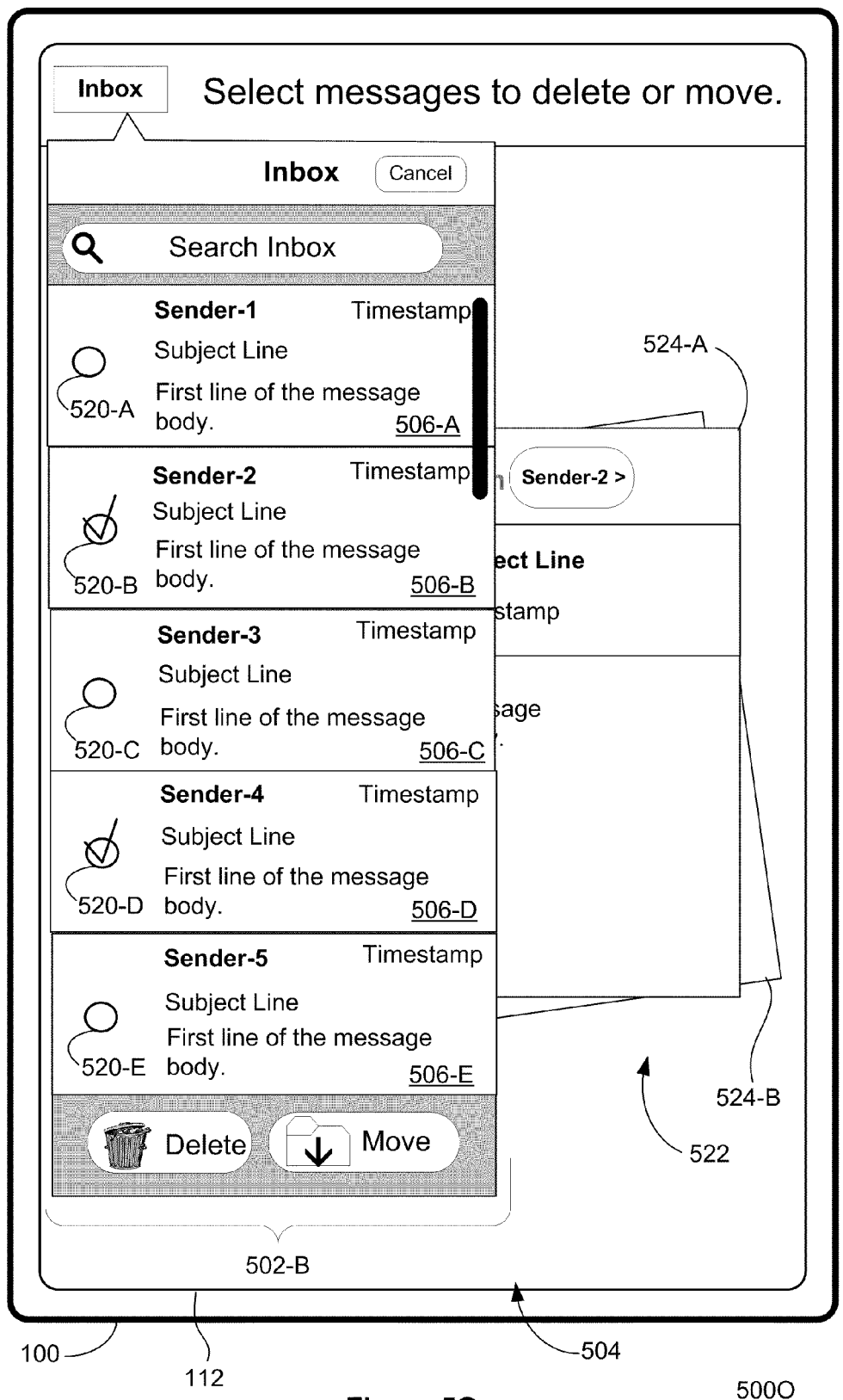

FIGS. 5A-5O illustrate exemplary user interfaces for manipulating information items in folders in accordance with some embodiments. The user interfaces in these figures are used to illustrate the processes described below, including the processes in FIGS. 6A-6C and 7A-7B.

UI 500A (FIG. 5A) depicts a user interface, in landscape orientation, of an email client (e.g., email client module 140), displayed on a display (e.g., touch screen 112) of a device (e.g., device 100). The user interface includes an items area 502 and a content area 504. The items area 502 is displayed as a sidebar items area 502-A adjacent to content area 504 while in landscape orientation. The items area 502 can display, for example, a list of email items 506 in a folder (in the case of UI 500A, the inbox). In UI 500A, the list of email items 506 shows respective email items 506-A, 506-B, and 506-C, each of which corresponds to a particular email message. The list of email items 506 is scrollable using, for example, a vertical finger flick gesture on the touch screen 112. The email items 506 in items area 502 are selectable using, for example, a tap gesture. For example, a user can select an email item 506 in the items area 502 to have the contents of the email message corresponding to the selected email item 506 displayed in the content area 504. Also displayed in the items area 502 are one or more interactive controls (e.g., buttons, search fields, etc.). For example, Mailboxes button 508 can be used to change the items area 502 to a view that shows a list of email folder items. A search field 517 can be used for searching emails matching one or more specified criteria. Edit button 510 can be used to enter an email item manipulation mode within the items area 502. From the email item manipulation mode, a user can move emails to a different folder or to delete emails. FIG. 5A depicts a contact 512 detected at location 512-A corresponding to Edit button 510. In response to the detection of contact 512, the email client enters email item manipulation mode.

The content area 504 can display, for example, the contents 505 (e.g., sender, recipient, subject, message body, attachments, etc.) of an email message corresponding to a selected email item 506. One or more interactive controls 507 (e.g., a Move message button, a Delete message button, a Back button, a Compose new message button, etc.) can also be displayed in the content area 504.

UI 500B (FIG. 5B) depicts the email client in email item manipulation mode. In items area 502, Delete button 514, Move button 516, and Cancel button 518 are displayed. A search field 517 for searching emails can also be displayed in items area 502. Each email item 506 is displayed with a respective circular checkbox 520. While in email item manipulation mode, one or more of the email items 506 can be selected. For example, a tap gesture can be performed at a location on the touch screen 112 corresponding to an email item 506. The checkboxes 520 of the selected email items 506 are displayed as checked. After one or more email items 506 are selected, Delete button 514 or Move button 516 can be selected to activate a delete operation or a move operation, respectively, for the selected email items 506. Cancel button 518 can be selected to exit email item manipulation mode without any changes. In some embodiments, any message displayed in the content area 504 can be dimmed, shaded, grayed out, or otherwise de-emphasized during email item manipulation mode before any email item is selected. In some embodiments, during email item manipulation mode, content area 504 is clear of any message contents 505.

In FIG. 5B, a contact 509 is detected at a location 509-A corresponding to email item 506-B. In response to the detection of the contact 509, email item 506-B is selected. UI 500C (FIG. 5C) depicts selection of email item 506-B within email item manipulation mode. Checkbox 520-B corresponding to email item 506-B is checked. An email message object 524-A, corresponding to email item 506-B, is displayed in content area 504 on top of a pile 522 of email message objects 524. The email message object 524-A is displayed as a scaled version of the contents of the email message corresponding to email item 506-B. In some embodiments, an animation is displayed showing the email message object 524-A sliding from under items area 502 across the touch screen 112 into content area 504 (as indicated by arrows 526).

UI 500D (FIG. 5D) depicts selection of email item 506-D within email item manipulation mode. The list of email items 506 can be scrolled to reveal email item 506-D in items area 502. Checkbox 520-D corresponding to email item 506-D is checked. Email message object 524-B is displayed on top of the pile 522 of email message objects 524, overlapping at least a portion of email message object 524-A. Email message object 524-B is displayed as a scaled version of the contents of the email message corresponding to email item 506-D. In some embodiments, an animation is displayed showing the email message object 524-B sliding from under items area 502 across the touch screen 112 into content area 504 (as indicated by arrows 526).

As email items 506 are selected, corresponding email message objects 524 are added to the pile 522 in the order of selection, with the most recent selection going on top of the pile, as in a stack data structure. If an email item is de-selected, the corresponding email message object is removed from the pile, but the email message objects above it maintain their order. If the de-selected email item is selected again, the corresponding email message object is added to the top of the pile as if newly selected, without regard for the fact that it was selected before.

In some embodiments, email message objects 524 are displayed in the pile 522 in a cyclical manner. In some embodiments, the email message objects in the pile are displayed on the pile with a cycle of orientations. For example, a first object is added to the pile with a predefined upright orientation. Then, the next (second) object is added to the pile in a predefined orientation that is tilted right slightly from the upright orientation. Then, the next (third) object is added to the pile in a predefined orientation that is tilted left slightly from the upright orientation. Then, the next (fourth) object is added to the pile in an upright orientation and completely overlapping the first object, restarting the cycle, and so forth. The number of orientations within one cycle is an integer of 1 or more. In some embodiments, the number is 2, 3, 4, or 5.

In some embodiments, the email message objects in the pile are all oriented upright but cascaded, so that one object partially overlaps the one immediately below as in cascading windows of a software application, up to a certain number, and the cycle starts again. For example, a first object is put on the pile. Then second and third objects are put on the pile, cascaded from the first object. The fourth object is put on the pile but overlaps completely the first object. The fifth and sixth objects are cascaded from the fourth object and overlap completely the second and third objects, respectively. The seventh object overlaps the first and fourth objects completely, and so forth. The number of objects within one cycle is an integer of 1 or more. In some embodiments, the number is 2, 3, 4, or 5.

With email items 506-B and 506-D selected, a contact 528 is detected at location 528-A corresponding to Move button 516. In response to detection of contact 528, a list of email folder items is displayed, as depicted in FIG. 5E. UI 500E (FIG. 5E) depicts a list of email folder items 530 displayed in items area 502. The email folder items 530 include, for example, an inbox folder item 530-A corresponding to the inbox, a drafts folder item 520-B corresponding to a drafts folder, a sent emails folder item 530-C corresponding to a sent emails folder, a trash folder item 530-D corresponding to a trash folder, and zero or more user-created folder items 530-E, 530-F, 530-G corresponding to respective user-created email folders (e.g., Personal, Travel, Work). In some embodiments, when the list of email folder items 530 is displayed, replacing the list of email items 506, an animation is displayed showing the list of email items 506 sliding out of items area 502 and the list of email folder items 530 sliding into the items area 502.

A user can select one of the folder items 530 to select a destination folder for the email messages corresponding to the email message objects 524 in the pile 522. A contact 532 is detected at location 532-A corresponding to the Personal folder item 530-E; the Personal folder is selected as the destination folder for the email messages.

UI 500F (5F) depicts an animation showing email message objects 524 in the pile 522 being moved to the selected Personal folder item 530-E. The animation 534 is a graphical representation of the email messages corresponding to the email message objects 524-A and 524-B in the pile 522 being moved from the inbox to the Personal folder corresponding to Personal folder item 530-E. The animation 534 shows the entire pile 522 of email message objects 524 shrinking (scaling down) as it moves (e.g., in a linear path, in a curved path) toward the Personal folder item 530-E. When the scaled-down pile 522 is substantially on top of the Personal folder item 530-E, the pile 522 disappears as if swallowed by the Personal folder item 530-E. The Personal folder item 530-E can be shown as swelling briefly, to indicate the completion of the swallowing of the pile 522.

UI 500G (FIG. 5G) depicts the email client user interface after the email messages corresponding to the email message objects 524 in the pile 522 were moved to the Personal folder. The items area 502 shows the list of email items 506 corresponding to email messages remaining in the inbox (e.g., email items 506-A, 506-C, 506-E). Displayed in the content area 504 are the contents 505 of an email messages remaining in the inbox, as well as one or more interactive controls (e.g., Delete button, Compose new message button, etc.). Also displayed in the items area 502 are interactive controls such as Mailboxes button 508, search field 517, and Edit button 510.

UI 500H (FIG. 5H) depicts the email client user interface in portrait orientation. In portrait orientation, the content area 504 can take up the entire width of the screen, as depicted in FIG. 5H. Displayed in the content area 504 are the contents 505 of an email message in a folder (in the case of UI 500H, the inbox). One or more interactive controls 507 (e.g., a Move message button, a Delete message button, a Back button, a Compose new message button, etc.) are displayed in the content area 504. Also displayed are arrow buttons 536 for displaying the contents of another email message in the folder, and a Folder button 538 for bringing up a list of email items in the folder.

In UI 500H, A contact 540 is detected at location 540-A corresponding to Folder button 538. In response to detection of the contact, a list of email messages, represented by email items 506, in the folder, is displayed. UI 500I (FIG. 5I) depicts an items area 502 displayed over the content area 504. The items area 502 is displayed as a pop-up items area 502-B overlapping a portion of the content area 504 while in portrait orientation. Displayed in the items area 502 are: a list of email items 506 corresponding to email messages in a folder (e.g., the inbox), Mailboxes button 508, a search field 517, and Edit button 510. In UI 500I, the list of email items 506 shows respective email items 506-A, 506-B, 506-C, 506-D, and 506-E, each of which corresponds to a particular email message. The list of email items 506 is scrollable using, for example, a vertical finger flick gesture on the touch screen 112. The email items 506 are selectable using, for example, a tap gesture. For example, a user can select an email item 506 in the items area 502 to have the contents of the email message corresponding to the selected email item 506 displayed in the content area 504.

In UI 500I, a contact 542 is detected at a location 542-A corresponding to Edit button 510. In response to the detection of contact 542, the email client enters email item manipulation mode. UI 500J (FIG. 5J) depicts the email client in email item manipulation mode while in portrait orientation. Email items 506 are shown with corresponding checkboxes 520. After one or more email items 506 are selected, Delete button 514 or Move button 516 can be selected to activate a delete operation or a move operation, respectively, for the selected email items 506. Cancel button 518 can be selected to exit email item manipulation mode without any changes. In some embodiments, any message displayed in the content area 504 can be dimmed, shaded, grayed out, or otherwise de-emphasized during email item manipulation mode before any email item is selected. In some embodiments, during email item manipulation mode, content area 504 is clear of any message contents 505.

UI 500K (FIG. 5K) depicts multiple email items selected while in email item manipulation mode. Email items 506-B, 506-C, and 506-D are selected; corresponding checkboxes 520-B, 520-C, and 520-D are checked. A pile 522 of email message objects 524 is displayed in content area 504 as scaled versions of the contents of the corresponding email messages. The pop-up items area 502-B partially overlaps the pile 522. The pile 522 in UI 500K includes, in order of addition to the pile from bottom to top (which is based on the order of selection of the corresponding email items), email message objects 524-B, 524-C, and 524-A, corresponding to email items 506-D, 506-C, and 506-B, respectively. In some embodiments, when an email item 506 is selected, an animation showing the corresponding email message object 524 sliding into view from under the items area 502-B, in a manner analogous to the animation described above with reference to FIGS. 5C-5D, is displayed. In some embodiments, the email message objects are displayed with differing orientations in a cyclical manner analogous to the manner described above with reference to FIG. 5D.

UI 500L (FIG. 5L) depicts movement of the pile 522 of email message objects using a gesture. While the pile 522 is stationary at its original location 522-A in content area 504, a contact 544 is detected at a location 544-A corresponding to the pile at location 522-A. As long as there is no lift-off of the contact 544, the pile 522 can be moved to other locations within content area 504. For example, the pile 522 can be moved to location 522-B from location 522-A by moving the contact 544 from location 544-A to 544-B without any intervening lift-off of the contact (e.g., using a drag gesture). This movement can be used to, for example, to reveal portions of the pile that are otherwise obscured by the items area 502-B. When a lift-off of the contact 544 is detected, the pile 522 recoils back to original location 522-A.

UI 500M (FIG. 5M) and UI 500N (FIG. 5N) depict the de-selection of an email item 506. While in email item manipulation mode, a selected email item can be deselected using, for example, a tap gesture, on a selected email item. In FIG. 5M, a contact 546 is detected at a location 546-A corresponding to email item 506-C. In response to the detection of contact 546, checkbox 520-C is unchecked. An animation showing corresponding email message object 524-C sliding out of the pile 522 (e.g., from original location 524-C-1 toward location 524-C-2, as indicated by arrows 548), under the pop-up items area 502-B, and out of the touch screen 112, is displayed. In some embodiments, because the email message object 524-C is not the topmost email message object in the pile 522, an animation showing a page curl or fold for the email message object(s) above object 524-C in the pile 522 (e.g., object 524-A), as depicted in FIG. 5M, is displayed while the sliding animation for the email message object corresponding to the deselected email item is displayed. When the email message object corresponding to the deselected email item has slid off of the pile 522, a page un-curl or un-fold animation is displayed. The page curl or fold reveals the sliding email message object as it slides off the pile 522. On the other hand, if the email message object corresponding to the deselected email item is on the top of the pile 522, then the sliding animation is displayed without displaying any page curl or fold animation.

In some embodiments, the page curl animation is displayed as leading from the top right corner, as depicted in FIG. 5M. In some other embodiments, the page curl animation is displayed as leading from the top left corner (which may be partially obscured by the pop-up items area 502-B), as depicted in FIG. 5N.

UI 500O (FIG. 5O) depicts a result of the de-selection of email item 506-C. Checkbox 520-C is unchecked, and email message object 524-C is no longer in the pile 522. If email item 506-C is selected again at this point, email message object 524-C goes on top of the pile 522.

It should be appreciated that while details described above with reference to FIGS. 5A-5O and depicted in FIGS. 5A-5O may be described and depicted with respect to a particular orientation (landscape or portrait), said details are equally applicable in an analogous manner to the opposite orientation. For example, the details regarding deselection of an email item and related animations, described above with reference to FIGS. 5M thru 5O and depicted in FIGS. 5M thru 5O with respect to a portrait orientation, are applicable in analogous manner to a landscape orientation.

Figure 6B:
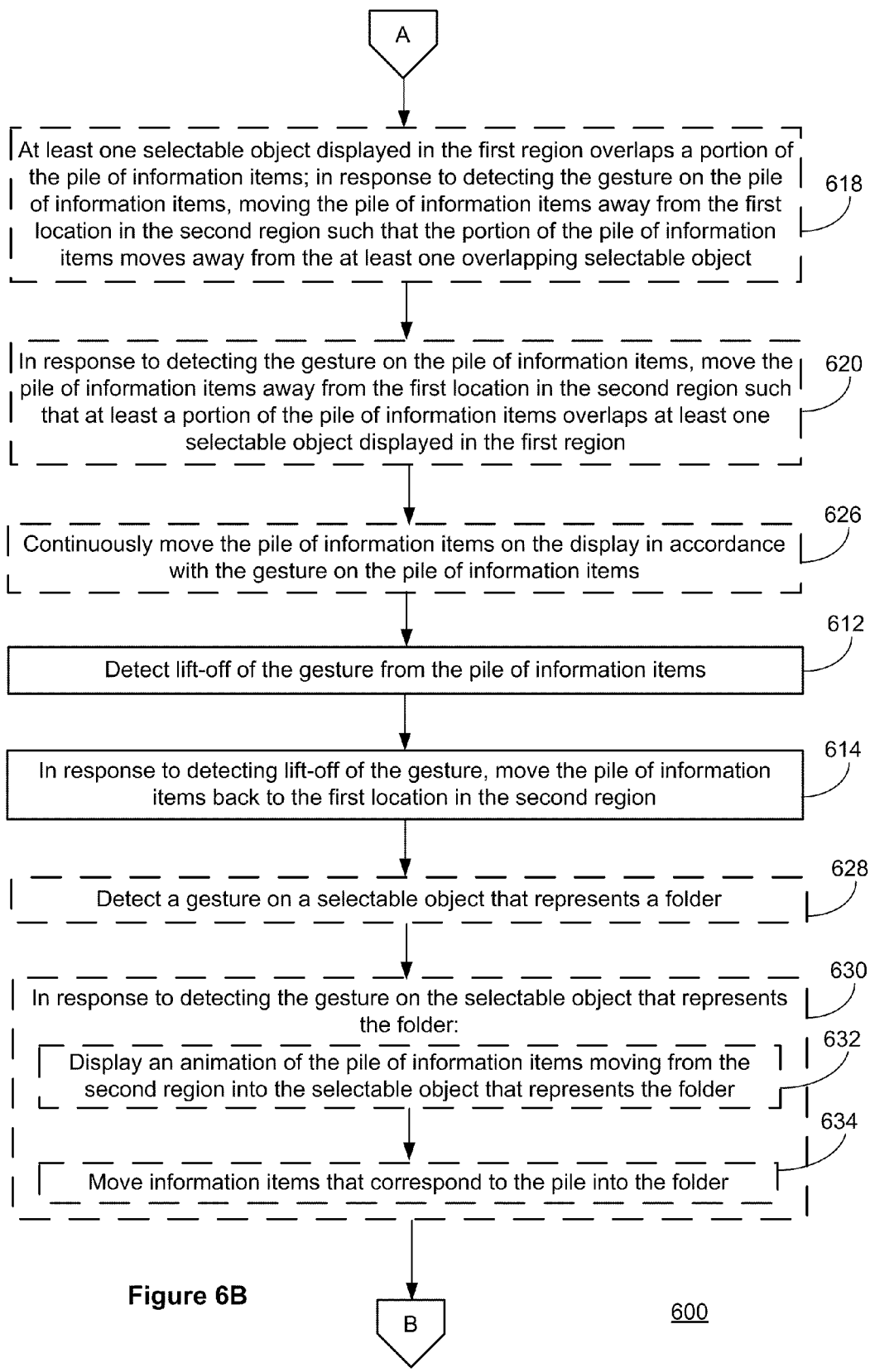
Figure 6C:
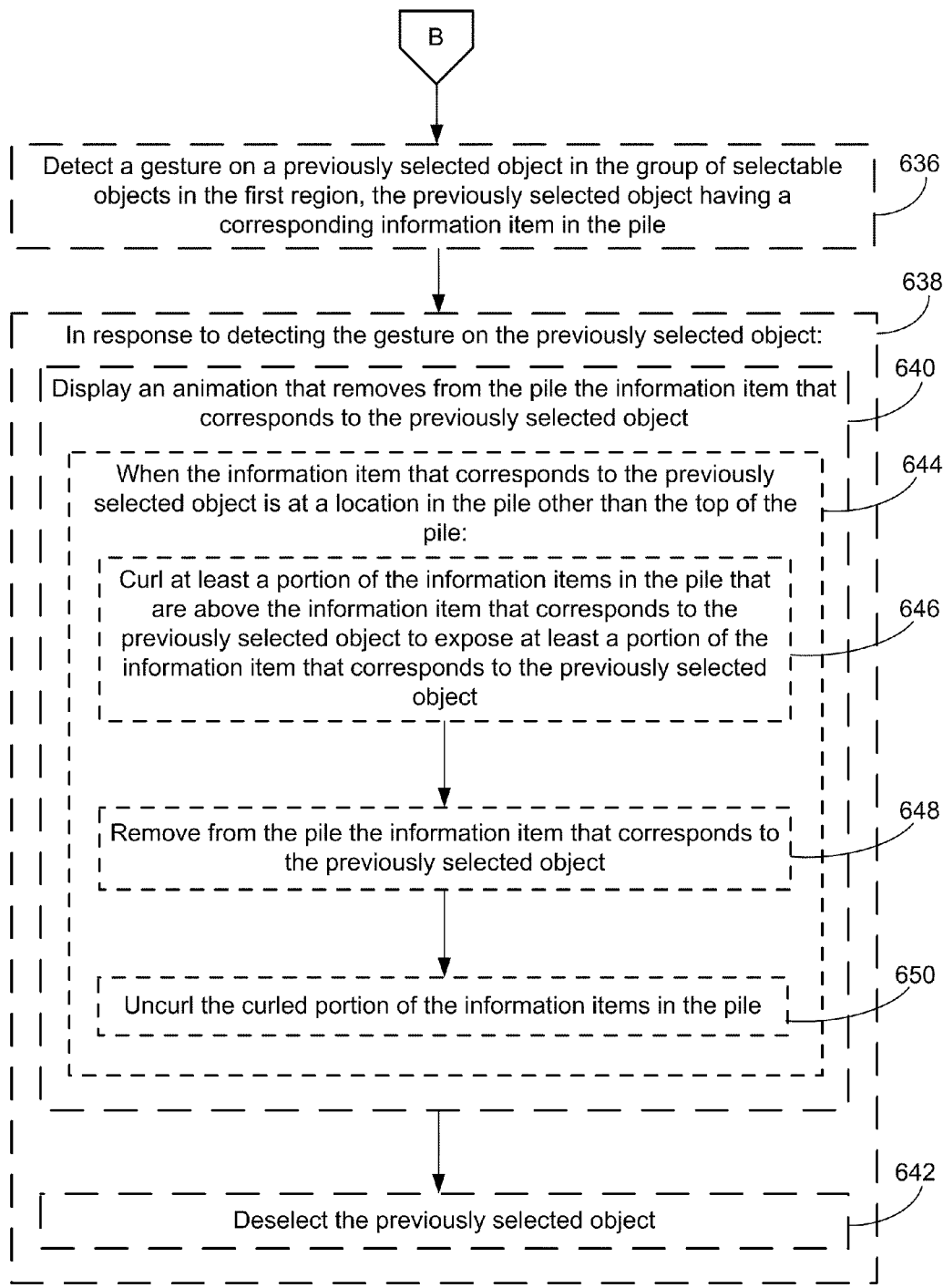

FIGS. 6A-6C are flow diagrams illustrating a method 600 of manipulating information items in folders in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to manipulate information items in folders. The method reduces the cognitive burden on a user when manipulating information items in folders, thereby creating a more efficient human-machine interface. For battery-operated computing devices, enabling a user to manipulate information items in folders faster and more efficiently conserves power and increases the time between battery charges.

The device displays (602) a group of selectable objects (e.g., icons, other visual representations) in a first region of the display, each selectable object corresponding to a respective information item. For example, in FIG. 5A, one or more email items 506 are displayed in items area 502. Each email item 506 corresponds to a respective email message (represented by a respective email message object 524). In some embodiments, the information items (e.g., email messages) are managed by the multifunction device (e.g., in a file system on the device and/or in a remote file system).

The device detects (604) selection of a plurality of selectable objects in the group of selectable objects (e.g., by detecting one or more gestures on or around the plurality of selectable objects). For example, in FIG. 5B, a contact 509 (e.g., resulting from a tap gesture) is detected at a location 509-A corresponding to email item 506-B, selecting the email item 506-B. Contacts detected at other locations corresponding to respective email items cause the selection of those respective email items. Multiple email items can be selected, as shown in, for example, FIGS. 5D and 5K.

In response to detecting selection of the plurality of selectable objects, the device displays (606) a pile of two or more information items corresponding to the plurality of selectable objects at a first location in a second region of the display, each information item having a partially overlapping position with a neighboring information item in the pile. For example, in FIG. 5K, a pile 522 of email message objects 524 is displayed in the content area 504 for the selected email items 506. The pile 522 is displayed at location 522-A. Each email message object 524 partially overlaps the email message object immediately below it and/or above it in the pile 522.

In some embodiments, the second region includes at least a portion of the first region. For example, in FIG. 5K, the content area 504 overlaps with a part of items area 502-B.

The device detects (608) a gesture (e.g., a drag gesture with a finger or stylus) on the pile of information items on the display. For example, in FIG. 5L, movement of the contact 544 (e.g., a drag gesture) on the pile 522 from location 544-A to 544-B can be detected by the device 100.

In response to detecting the gesture on the pile of information items, the device moves (610) the pile of information items away from the first location in the second region. For example, in FIG. 5L, in response to detection of movement of the contact 544 (e.g., a drag gesture), the pile 522 moves from location 522-A, away from items area 502-B, to location 522-B.

The device detects (612) lift-off of the gesture from the pile of information items. In response to detecting lift-off of the gesture, the device moves (614) the pile of information items back to the first location in the second region. For example, in FIG. 5L, if contact 544 lifts off and the lift-off is detected by the device 100, the pile 522 recoils back to position 522-A.

In some embodiments, a respective information item in the pile is oriented (616) in one of N predefined orientations in the pile, where N is an integer (e.g., N=1, 2, 3, 4, or 5). For example, in FIGS. 5D and 5K, the email message objects 524 in the pile 522 are displayed with different orientations in a cyclical manner. For example, a first object in a pile is displayed as upright. Then the next object in the pile is displayed as tilted to the right. Then the next object is displayed as tilted to the left. The next object is displayed as upright, restarting the cycle of three different orientations. The number of orientations in a cycle, as well as the orientations themselves, can be predefined.

In some embodiments, at least one selectable object displayed in the first region overlaps a portion of the pile of information items; and the device, in response to detecting the gesture on the pile of information items, moves (618) the pile of information items away from the first location in the second region such that the portion of the pile of information items moves away from the at least one overlapping selectable object. For example, in FIG. 5L, the email items 506 in items are 502-B are displayed as overlapping the content area 504 and the pile 522. In response to the movement of contact 544 from location 544-A to location 544-B, the device can move the pile 522 away from location 524-A, away from the email items 506 in the items area 502-B.

In some embodiments, in response to detecting the gesture on the pile of information items, the device moves (620) the pile of information items away from the first location in the second region such that at least a portion of the pile of information items overlaps at least one selectable object displayed in the first region. For example, in FIG. 5L, in response to detection of movement of contact 544 toward the items area 502-B, the device can move the pile 522 away from location 524-A and under the email items 506 in the items area 502-B.

In some embodiments, in response to detecting a respective gesture on a respective selectable object, the device displays (622) an animation that adds a corresponding information item to the pile (e.g., an animation that adds the corresponding information item on top of other information items in the pile). For example, in FIG. 5D, in response to selection of email item 506-D (i.e., detection of a gesture (e.g., tap gesture) on the email item) the corresponding email message object 524-B is added to the top of the pile 522. An animation showing the email message object sliding (indicated by arrows 526) to the top of the pile can be displayed.

In some embodiments, the animation includes (624) moving the corresponding information item into a position in the second region such that the corresponding information item partially overlaps a neighboring information item in the pile. For example, in FIG. 5D, in the animation adding email message object 524-B to the pile 522, email message object 524-B is added to the top of the pile 522 and partially overlapping email message object 524-A.

In some embodiments, the device continuously moves (626) the pile of information items on the display in accordance with the gesture on the pile of information items (e.g., moving along a trajectory defined by the gesture on the pile of information items). For example, in FIG. 5L, in response to detection of movement of contact 544, the device can move the pile 522 in the direction of the movement of the contact 544 so long as there is no intervening lift-off of the contact 544.

In some embodiments, the device detects (628) a gesture (e.g., a finger or stylus gesture) on a selectable object (e.g., a folder icon, a bar showing the folder's name, or other graphical representation); that represents a folder. In response to detecting the gesture on the selectable object that represents the folder (630): the device displays (632) an animation of the pile of information items moving from the second region into the selectable object that represents the folder, and moves (634) information items that correspond to the pile into the folder (e.g., moving selected email messages into a folder selected by a user with a gesture). For example, in FIGS. 5E thru 5F, multiple folder items 530 are displayed in the items area 502. A contact 532 (e.g., from a tap gesture) is detected at a location 532-A corresponding to folder item 532-E, which corresponds to the Personal folder. In response to detection of contact 532, an animation 534 showing the pile 522 moving from content area 504 to the folder item 530-E is displayed. Further, the email messages corresponding to the email message objects 524-A and 524-B in the pile 522 (i.e., the selected email messages) are moved into the Personal folder.

In some embodiments, the device detect (636) a gesture (e.g., a finger or stylus gesture) on a previously selected object in the group of selectable objects in the first region, the previously selected object having a corresponding information item in the pile. In other words, the previously selected object has already been selected, so it already has a corresponding information item in the pile. In response to detecting (638) the gesture on the previously selected object: the device displays (640) an animation that removes from the pile the information item that corresponds to the previously selected object, and deselects (642) the previously selected object. For example, in FIG. 5M, contact 546 (e.g., from a tap gesture) is detected at a location 546-A corresponding to previously selected email item 506-C. Email item 506-C corresponds to email message object 524-C in the pile 522. In response to detection of the contact 546, an animation removing email message object 524-C from the pile 522 is displayed, and email item 506-C is deselected.

In some embodiments, the animation includes, when the information item that corresponds to the previously selected object is at a location in the pile other than the top of the pile (644): curling (646) at least a portion of the information items in the pile that are above the information item that corresponds to the previously selected object to expose at least a portion of the information item that corresponds to the previously selected object; removing (648) from the pile the information item that corresponds to the previously selected object; and uncurling (650) the curled portion of the information items in the pile. For example, in FIGS. 5M and 5N, the email message object 524-C to be removed is not on the top of the pile 522. A page curl animation curling email message object 524-A, which is above email message object 524-C, is displayed. This exposes a portion of email message object 524-C. An animation removing email message object 524-C from the pile is displayed. An animation undoing the page curl of email message object 524-A is displayed.

In some embodiments, the uncurling occurs after the information item that corresponds to the previously selected object from the pile is removed. In some embodiments, the uncurling occurs while the information item that corresponds to the previously selected object from the pile is removed.

Note that details of the processes described above with respect to method 600 (FIGS. 6A-6C) are also applicable in an analogous manner to the method described below. For example, the animations, selectable objects, selection of selectable objects, etc. described with reference to FIGS. 7A-7B may have one or more of the characteristics of the various animations described above with reference to method 600. For brevity, these details are not repeated below.

FIGS. 7A-7B are flow diagrams illustrating a method 700 of manipulating information items in folders in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to manipulate information items in folders. The method reduces the cognitive burden on a user when manipulating information items in folders, thereby creating a more efficient human-machine interface. For battery-operated computing devices, enabling a user to manipulate information items in folders faster and more efficiently conserves power and increases the time between battery charges.

The device displays (702) a group of selectable objects (e.g., icons, a bar showing information for the selectable object, other graphical representation) in a first region of the display, each selectable object corresponding to a respective information item. For example, in FIG. 5A, one or more email items 506 are displayed in items area 502. Each email item 506 corresponds to a respective email message (represented by a respective email message object 524). In some embodiments, the information items are managed by the multifunction device (e.g., in a file system on the device and/or in a remote file system).

The device detects (704) selection of a plurality of selectable objects in the group of selectable objects (e.g., by detecting one or more gestures on or around the plurality of selectable objects). Multiple email items can be selected, as illustrated in FIGS. 5D and 5K, using, e.g., tap gestures.

In response to detecting selection of the plurality of selectable objects, the device displays (706) a pile of two or more information items corresponding to the plurality of selectable objects in a second region of the display, each information item having a partially overlapping position with a neighboring information item in the pile. In some embodiments, the second region includes at least a portion of the first region. For example, in FIG. 5K, a pile 522 of email message objects 524 is displayed in the content area 504 for the selected email items 506. Each email message object 524 partially overlaps the email message object immediately below it and/or above it in the pile 522.

The device detects (708) a gesture (e.g., a finger or stylus gesture) on a previously selected object in the group of selectable objects in the first region, the previously selected object having a corresponding information item in the pile. In other words, the previously selected object has already been selected, so it already has a corresponding information item in the pile. In response to detecting the gesture on the previously selected object (710): the device displays (712) an animation that removes from the pile the information item that corresponds to the previously selected object, and deselects (714) the previously selected object. For example, in FIG. 5M, contact 546 (e.g., from a tap gesture) is detected at a location 546-A corresponding to previously selected email item 506-C. Email item 506-C corresponds to email message object 524-C in the pile 522. In response to detection of the contact 546, an animation removing email message object 524-C from the pile 522 is displayed, and email item 506-C is deselected.

In some embodiments, the animation includes, when the information item that corresponds to the previously selected object is at a location in the pile other than the top of the pile (716): curling (718) at least a portion of the information items in the pile that are above the information item that corresponds to the previously selected object to expose at least a portion of the information item that corresponds to the previously selected object; removing (720) from the pile the information item that corresponds to the previously selected object; and uncurling (722) the curled portion of the information items in the pile. For example, in FIGS. 5M and 5N, the email message object 524-C to be removed is not on the top of the pile 522. A page curl animation curling email message object 524-A, which is above email message object 524-C, is displayed. This exposes a portion of email message object 524-C. An animation removing email message object 524-C from the pile is displayed. An animation undoing the page curl of email message object 524-A is displayed.

In some embodiments, the uncurling occurs after the information item that corresponds to the previously selected object from the pile is removed. In some embodiments, the uncurling occurs while the information item that corresponds to the previously selected object from the pile is removed.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6C, 7A-7B may be implemented by components depicted in FIGS. 1A-1C. For example, detection operation 608 and moving operation 610 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 180 associated with the detection of the event or sub-event. Event handler 180 may utilize or call data updater 176 or object updater 177 to update the internal state of application 136-1 data. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
a touch-sensitive display;
one or more processors;
memory; and
one or more programs, wherein the one or more programs are stored in the memory and configured to be executed by the one or more processors, the one or more programs including instructions for:
displaying a group of selectable objects in a first region of the display, each selectable object corresponding to only a single respective information item;
detecting selection of a plurality of selectable objects in the group of selectable objects;
in response to detecting selection of the plurality of selectable objects, displaying a pile of two or more information items corresponding to the plurality of selectable objects at a first location in a second region of the display, each information item having a partially overlapping position with a neighboring information item in the pile, wherein the second region is displayed without a pile of information items if no selectable objects in the first region are selected;
detecting a gesture on the pile of information items on the display;
in response to detecting the gesture on the pile of information items, moving the pile of information items away from the first location in the second region;
while the pile of information items is located away from the first location in the second region, detecting lift-off of the gesture from the pile of information items; and
in response to detecting lift-off of the gesture, moving the pile of information items back to the first location in the second region.

2. The device of claim 1, wherein a respective information item in the pile is oriented in one of N predefined orientations in the pile, where N is an integer.

3. The device of claim 1, wherein at least one selectable object displayed in the first region overlaps a portion of the pile of information items, the device including instructions for:
in response to detecting the gesture on the pile of information items, moving the pile of information items away from the first location in the second region such that the portion of the pile of information items moves away from the at least one overlapping selectable object.

4. The device of claim 1, including instructions for:
in response to detecting the gesture on the pile of information items, moving the pile of information items away from the first location in the second region such that at least a portion of the pile of information items overlaps at least one selectable object displayed in the first region.

5. The device of claim 1, including instructions for:
in response to detecting a respective gesture on a respective selectable object, displaying an animation that adds a corresponding information item to the pile.

6. The device of claim 5, wherein the animation includes moving the corresponding information item into a position in the second region such that the corresponding information item partially overlaps a neighboring information item in the pile.

7. The device of claim 1, including instructions for:
continuously moving the pile of information items on the display in accordance with the gesture on the pile of information items.

8. The device of claim 1, including instructions for:
detecting a gesture on a selectable object that represents a folder; and,
in response to detecting the gesture on the selectable object that represents the folder:

displaying an animation of the pile of information items moving from the second region into the selectable object that represents the folder; and moving information items that correspond to the pile into the folder.

9. The device of claim 1, including instructions for:

detecting a gesture on a previously selected object in the group of selectable objects in the first region, the previously selected object having a corresponding information item in the pile; and in response to detecting the gesture on the previously selected object:

displaying an animation that removes from the pile the information item that corresponds to the previously selected object; and deselecting the previously selected object.

10. The device of claim 9, wherein the animation includes:

when the information item that corresponds to the previously selected object is at a location in the pile other than the top of the pile:

curling at least a portion of the information items in the pile that are above the information item that corresponds to the previously selected object to expose at least a portion of the information item that corresponds to the previously selected object;

removing from the pile the information item that corresponds to the previously selected object; and, uncurling the curled portion of the information items in the pile.

11. The device of claim 1, wherein the single respective information item is an email item.

12. The device of claim 1, wherein the first region covers a part of the pile of information items.

13. A method, comprising:

at a multifunction device with a touch-sensitive display:

displaying a group of selectable objects in a first region of the display, each selectable object corresponding to only a single respective information item;

detecting selection of a plurality of selectable objects in the group of selectable objects;

in response to detecting selection of the plurality of selectable objects, displaying a pile of two or more information items corresponding to the plurality of selectable objects at a first location in a second region of the display, each information item having a partially overlapping position with a neighboring information item in the pile, wherein the second region is displayed without a pile of information items if no selectable objects in the first region are selected;

detecting a gesture on the pile of information items on the display;

in response to detecting the gesture on the pile of information items, moving the pile of information items away from the first location in the second region;

while the pile of information items is located away from the first location in the second region, detecting lift-off of the gesture from the pile of information items; and in response to detecting lift-off of the gesture, moving the pile of information items back to the first location in the second region.

14. The method of claim 13, wherein the single respective information item is an email item.

15. The method of claim 13, wherein the first region covers a part of the pile of information items.

16. A non-transitory computer readable storage medium storing one or more programs, the one or more programs comprising instructions, which when executed by a multifunction device with a touch-sensitive display, cause the device to:

display a group of selectable objects in a first region of the display, each selectable object corresponding to only a single respective information item;

detect selection of a plurality of selectable objects in the group of selectable objects;

in response to detecting selection of the plurality of selectable objects, display a pile of two or more information items corresponding to the plurality of selectable objects at a first location in a second region of the display, each information item having a partially overlapping position with a neighboring information item in the pile, wherein the second region is displayed without a pile of information items if no selectable objects in the first region are selected;

detect a gesture on the pile of information items on the display;

in response to detecting the gesture on the pile of information items, move the pile of information items away from the first location in the second region;

while the pile of information items is located away from the first location in the second region, detect lift-off of the gesture from the pile of information items; and in response to detecting lift-off of the gesture, move the pile of information items back to the first location in the second region.

17. The computer readable storage medium of claim 16, wherein a respective information item in the pile is oriented in one of N predefined orientations in the pile, where N is an integer.

18. The computer readable storage medium of claim 16, wherein at least one selectable object displayed in the first region overlaps a portion of the pile of information items, the computer readable storage medium including instructions, which when executed by the multifunction device, cause the device to:

in response to detecting the gesture on the pile of information items, move the pile of information items away from the first location in the second region such that the portion of the pile of information items moves away from the at least one overlapping selectable object.

19. The computer readable storage medium of claim 16, including instructions, which when executed by the multifunction device, cause the device to:

in response to detecting the gesture on the pile of information items, move the pile of information items away from the first location in the second region such that at least a portion of the pile of information items overlaps at least one selectable object displayed in the first region.

20. The computer readable storage medium of claim 16, including instructions, which when executed by the multifunction device, cause the device to:

in response to detecting a respective gesture on a respective selectable object, display an animation that adds a corresponding information item to the pile.

21. The computer readable storage medium of claim 20, wherein the animation includes moving the corresponding information item into a position in the second region such that the corresponding information item partially overlaps a neighboring information item in the pile.

22. The computer readable storage medium of claim 16, including instructions, which when executed by the multifunction device, cause the device to:

continuously move the pile of information items on the display in accordance with the gesture on the pile of information items.

23. The computer readable storage medium of claim 16, including instructions, which when executed by the multifunction device, cause the device to:
detect a gesture on a selectable object that represents a folder; and,
in response to detecting the gesture on the selectable object that represents the folder:
display an animation of the pile of information items moving from the second region into the selectable object that represents the folder; and
move information items that correspond to the pile into the folder.

24. The computer readable storage medium of claim 16, including instructions, which when executed by the multifunction device, cause the device to:
detect a gesture on a previously selected object in the group of selectable objects in the first region, the previously selected object having a corresponding information item in the pile; and
in response to detecting the gesture on the previously selected object:
display an animation that removes from the pile the information item that corresponds to the previously selected object; and
deselect the previously selected object.

25. The computer readable storage medium of claim 24, wherein the instructions to display the animation include instructions to:
when the information item that corresponds to the previously selected object is at a location in the pile other than the top of the pile:
curl at least a portion of the information items in the pile that are above the information item that corresponds to the previously selected object to expose at least a portion of the information item that corresponds to the previously selected object;
remove from the pile the information item that corresponds to the previously selected object; and
uncurl the curled portion of the information items in the pile.

26. The computer readable storage medium of claim 16, wherein the single respective information item is an email item.

27. The computer readable storage medium of claim 16, wherein the first region covers a part of the pile of information items.

28. A multifunction device, comprising:
a touch-sensitive display;
one or more processors;
memory; and
one or more programs, wherein the one or more programs are stored in the memory and configured to be executed by the one or more processors, the one or more programs including instructions for:
displaying a group of selectable objects in a first region of the display, each selectable object corresponding to only a single respective information item;
detecting selection of a plurality of selectable objects in the group of selectable objects;
in response to detecting selection of the plurality of selectable objects, displaying a pile of two or more information items corresponding to the plurality of selectable objects in a second region of the display, each information item having a partially overlapping position with a neighboring information item in the pile, wherein the second region is displayed without a pile of information items if no selectable objects in the first region are selected;
detecting a gesture on a previously selected object in the group of selectable objects in the first region, the previously selected object having a corresponding information item in the pile; and
in response to detecting the gesture on the previously selected object:
displaying an animation that removes from the pile the information item that corresponds to the previously selected object; and
deselecting the previously selected object.

29. The device of claim 28, wherein the animation includes:
when the information item that corresponds to the previously selected object is at a location in the pile other than the top of the pile:
curling at least a portion of the information items in the pile that are above the information item that corresponds to the previously selected object to expose at least a portion of the information item that corresponds to the previously selected object;
removing from the pile the information item that corresponds to the previously selected object; and,
uncurling the curled portion of the information items in the pile.

30. The device of claim 28, wherein the single respective information item is an email item.

31. The device of claim 28, wherein the first region covers a part of the pile of information items.

32. A method, comprising:
at a multifunction device with a touch-sensitive display:
displaying a group of selectable objects in a first region of the display, each selectable object corresponding to only a single respective information item;
detecting selection of a plurality of selectable objects in the group of selectable objects;
in response to detecting selection of the plurality of selectable objects, displaying a pile of two or more information items corresponding to the plurality of selectable objects in a second region of the display, each information item having a partially overlapping position with a neighboring information item in the pile, wherein the second region is displayed without a pile of information items if no selectable objects in the first region are selected;
detecting a gesture on a previously selected object in the group of selectable objects in the first region, the previously selected object having a corresponding information item in the pile; and
in response to detecting the gesture on the previously selected object:
displaying an animation that removes from the pile the information item that corresponds to the previously selected object; and
deselecting the previously selected object.

33. The method of claim 32, wherein the single respective information item is an email item.

34. The method of claim 32, wherein the first region covers a part of the pile of information items.

35. A non-transitory computer readable storage medium storing one or more programs, the one or more programs comprising instructions, which when executed by a multifunction device with a touch-sensitive display, cause the device to:

display a group of selectable objects in a first region of the display, each selectable object corresponding to only a single respective information item;

detect selection of a plurality of selectable objects in the group of selectable objects;

in response to detecting selection of the plurality of selectable objects, display a pile of two or more information items corresponding to the plurality of selectable objects in a second region of the display, each information item having a partially overlapping position with a neighboring information item in the pile, wherein the second region is displayed without a pile of information items if no selectable objects in the first region are selected;

detect a gesture on a previously selected object in the group of selectable objects in the first region, the previously selected object having a corresponding information item in the pile; and in response to detecting the gesture on the previously selected object:
- display an animation that removes from the pile the information item that corresponds to the previously selected object; and
- deselect the previously selected object.

36. The computer readable storage medium of claim 35, wherein the single respective information item is an email item.

37. The computer readable storage medium of claim 35, wherein the first region covers a part of the pile of information items.

* * * * *